United States Patent [19]

Sugano

[11] Patent Number: 4,566,355

[45] Date of Patent: Jan. 28, 1986

[54] SHIFT VALVE FOR AUTOMATIC TRANSMISSION

[75] Inventor: Kazuhiko Sugano, Zama, Japan

[73] Assignee: Nissan Motor Co., Ltd., Yokohama, Japan

[21] Appl. No.: 518,746

[22] Filed: Jul. 29, 1983

[51] Int. Cl.[4] .................. B60K 41/16; B60K 41/06
[52] U.S. Cl. .................................. 74/869; 74/878; 74/868
[58] Field of Search ................. 74/869, 868, 867, 878

[56] References Cited

U.S. PATENT DOCUMENTS

| 3,503,115 | 2/1971 | Iijima et al. | 74/869 |
| 3,572,479 | 3/1971 | Kelley | 192/4 |
| 3,685,372 | 8/1972 | Miyazaki | 74/869 X |
| 3,707,891 | 1/1973 | Asano et al. | 74/869 |
| 3,710,652 | 1/1973 | Miyazaki | 74/869 X |
| 3,831,465 | 8/1974 | Murakami | 74/869 |
| 3,978,743 | 9/1976 | Murakami | 74/869 |
| 4,148,232 | 4/1979 | Moriya | 74/869 |
| 4,274,308 | 6/1981 | Iwanaga et al. | 74/869 |
| 4,307,631 | 12/1981 | Iwanaga et al. | 74/869 |
| 4,349,088 | 9/1982 | Ito et al. | 192/3.3 |

FOREIGN PATENT DOCUMENTS 2944811 5/1980 Fed. Rep. of Germany .
2438211 4/1980 France .

OTHER PUBLICATIONS

European Search Report

Primary Examiner—Leslie A. Braun
Assistant Examiner—Dirk Wright
Attorney, Agent, or Firm—Schwartz, Jeffery, Schwaab, Mack, Blumenthal & Evans

[57] ABSTRACT

A shift valve comprises a spool having a downshift position for establishing a lower speed ratio and an upshift position for establishing a higher speed ratio, a plug, and a spring between the spool and plug. The spool has a pressure acting area which governor pressure acts on, while the plug has a pressure acting area which throttle pressure acts on. At low throttle pressures, the spool moves from the downshift position to the upshift position when a predetermined vehicle speed is attained. At higher throttle pressures, the spool moves between the downshift and upshift position depending upon the governor pressure and throttle pressure. The shift valve has a port formed therein which admits a downshift position hold signal fluid pressure (i.e., line pressure) between the spool and plug so as to hold the spool to the downshift position thereof.

3 Claims, 11 Drawing Figures

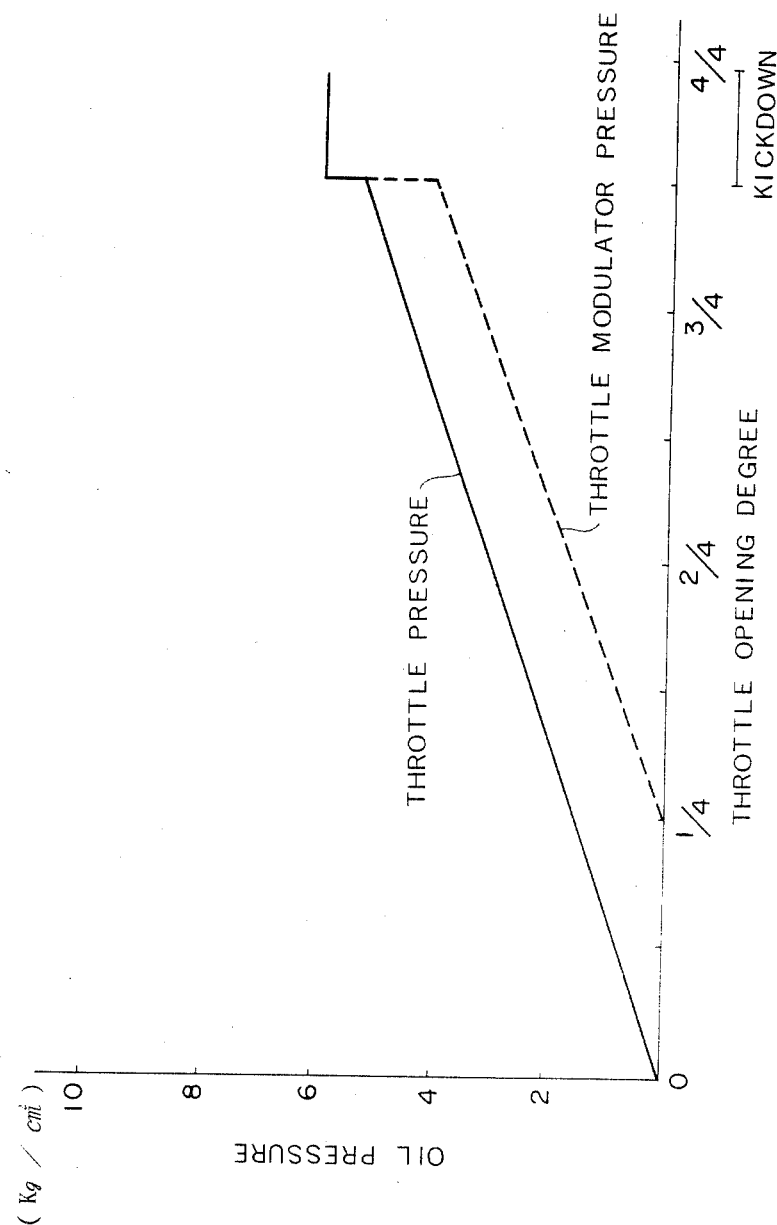

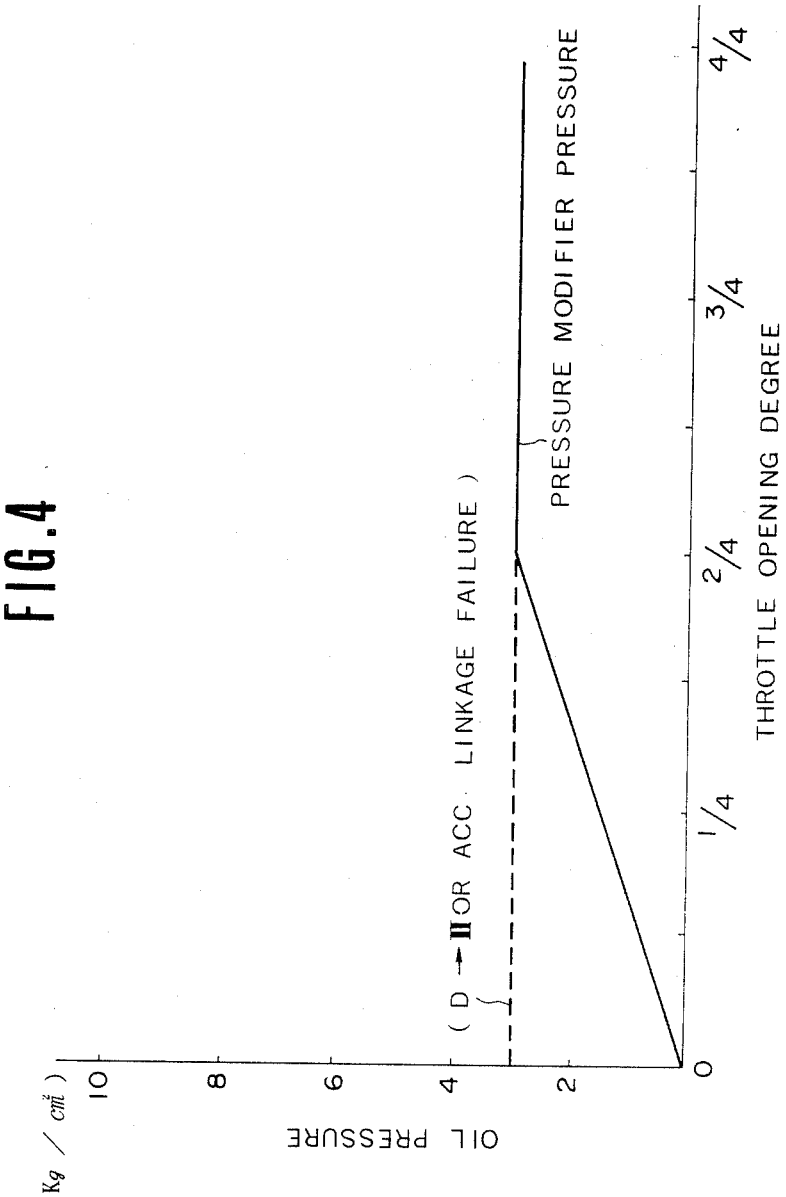

ly with the sun gear S1 and internal gear R1. The second planetary gear set G2 comprises a sun gear S2, an internal gear R2, a carrier PC2 carrying pinion gears P2 meshing simultaneously with the sun gear S2 and internal gear R2. The carrier PC1 is connectable via the first clutch C1 with an intermediate shaft M that serves as an input member for the second planetary gear set G2, and the sun gear S1 is connectable via the second clutch C2 with the intermediate shaft M. The sun gear S2 is constantly connected to the intermediate shaft M. The carrier PC1 is connectable via the third clutch C3 with the internal gear R2. Rotation of the sun gear S1 is arrestable by the first brake B1, while rotation of the internal gear R2 is arrestable by the second brake B2. The one-way clutch OWC allows rotation of the internal gear R2 in the same direction as the engine output shaft E rotates, but prevents rotation thereof in the reverse direction. The internal gear R1 and the carrier PC2 are connected to the output shaft O.

SHIFT VALVE FOR AUTOMATIC TRANSMISSION

BACKGROUND OF THE INVENTION

The present invention relates to a hydraulic control system for an automatic transmission and more particularly to a shift valve for a hydraulic control system.

Commonly, a shift valve for an automatic transmission receives a governor pressure variable with a vehicle speed which acts on one end of its spool and a throttle pressure variable with a throttle opening degree which acts on the other end of the spool so that the spool shifts its position depending upon the relation between the magnitudes of these pressures. It is also necessary that the spool of the shift valve move against the governor pressure to the downshift position, thereof during engine braking irrespective of the magnitudes of the throttle pressure and the governor pressure. To accomplish this function, a shuttle valve has to be arranged to admit a line pressure to the shift valve at the same port thereof where it usually receives the throttle pressure when engine braking is required. The fact that the shuttle valve has to be arranged presents a problem that a hydraulic circuit becomes complicated, and the installation of the shuttle valve requires an additional cost and space. Therefore, more cost and space are required for the installation of the shift valve.

SUMMARY OF THE INVENTION

An object of the present invention is to provide a shift valve which does not require a shuttle valve and is thus free from the above problem.

According to the present invention, there is provided a hydraulic control system for an automatic transmission for a motor vehicle having an engine including a throttle which opens in degrees, the transmission being shiftable between a plurality of forward speed ratios, including at least a pair of relatively higher and lower forward speed ratios. The hydraulic control system comprises:

a source of fluid pressure;

means communicating with the source of fluid pressure for producing a governor fluid pressure variable with the vehicle speed;

means communicating with the source of fluid pressure for producing a throttle fluid pressure variable with the degree of throttle opening;

means for producing a downshift position hold signal fluid pressure;

a shift valve for shifting the transmission between the lower and higher speed ratios, the shift valve comprising a spool having a downshift position for establishing the lower speed ratio and an upshift position for establishing the higher speed ratio, and having at least one pressure acting area which is exposed to the governor fluid pressure, a plug having a pressure acting area which is exposed to the throttle fluid pressure and a spring disposed between the spool and plug and acting therebetween, the governor pressure acting area, when acted upon by the governor pressure urges the spool to move from the downshift position thereof to the upshift position thereof against the spring, the throttle pressure acting area, when acted upon by the throttle fluid pressure, urges the plug to move the spool from the upshift position thereof to the downshift position thereof;

the spool having a first signal pressure acting area and the plug having a second signal pressure acting area;

a port in the shift valve effecting communication between the downshift position hold signal fluid pressure producing means and the first and second signal pressure acting areas, the first signal pressure acting area, when acted upon by the downshift position hold signal fluid pressure, urging the spool to move from the upshift position thereof to the downshift position thereof, the second signal pressure acting area, when acted upon by the downshift position hold signal fluid pressure, urges the plug to move away from the spool.

BRIEF DESCRIPTION OF THE DRAWINGS

FIG. 3 is a graph showing the variation in a throttle pressure versus the degree of throttle opening and that in a throttle modulator pressure versus the degree of throttle opening;

FIG. 4 is a graph showing the vatiation in a pressure modifier pressure versus the degree of throttle opening;

DETAILED DESCRIPTION OF THE INVENTION

Figure 1:
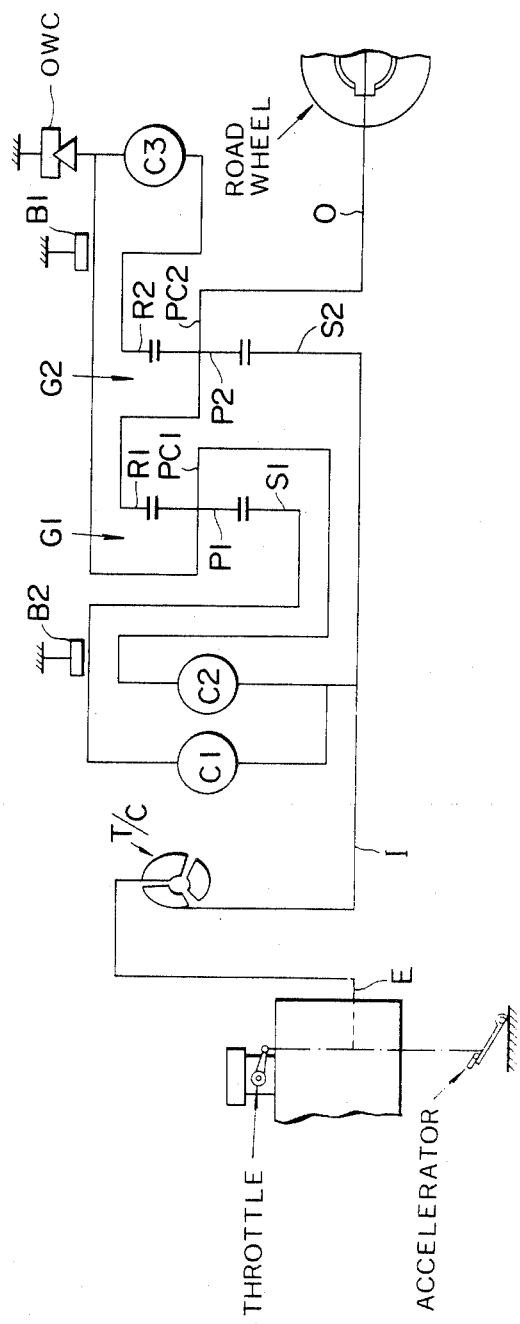
FIG. 1 is a schematic view of a power transmission mechanism of a power transmission mechanism of a four speed automatic transmission as illustrated in connection with an engine which has a throttle mounted in an intake passage and an accelerator pedal.

Referring to FIG. 1, there is illustrated a power transmission mechanism of a four forward speed and one reverse speed automatic transmission having an overdrive. This power transmission mechanism comprises an input shaft I operatively connected via a torque converter T/C to an engine output shaft E of an engine which has a throttle which opens in degrees, an output shaft O operatively connected to road wheels, only one being shown, via a final drive, not shown. A first planetary gear set G1 and a second planetary gear set G2 are connected between the input and output shafts I and O. A plurality of fluid operated friction units are provided which are made operative and inoperative for producing a plurality of speed ratios between the input shaft I and output shaft O. The fluid operated frictional units include a first clutch C1, a second clutch C2, a third clutch C3, a first brake B1, a second brake B2, and a one-way clutch OWC. The first planetary gear set G1 comprises a sun gear S1, an internal gear R1, a carrier PC1 carrying pinion gears P1 meshing simultaneously both the gears S1 and R1. The planetary gear set G2 comprises a sun gear S2, an internal gear R2 and a carrier PC2 carrying pinion gears P2 meshing simultaneously both gears S2 and R2. The carrier PC1 is connectable via the clutch C1 with the input shaft I, and the sun gear S1 is connectable via the clutch C2 with the input shaft I. The carrier PC1 is connectable via the clutch C3 with the internal gear R2. The sun gear S2 is constantly connected with the input shaft I. The internal gear R1 and carrier PC2 are constantly connected with the output shaft O. The brake B1 is arranged to anchor the carrier PC1. The brake B2 is arranged to anchor the sun gear S1. The one-way clutch OWC is so constructed that it allows forward rotation (i.e., the same rotation as that of the engine output shaft E), but prevents reverse rotation (i.e., the rotation opposite to the forward rotation). Thus, it acts as a brake only during reverse rotation.

In the above mentioned power transmission mechanism, the rotational state of each of the rotary elements (S1, S2, R1, R2, PC1, and PC2) of the planetary gear sets G1 and G2 can be varied by actuating selected one or combination of the clutches C1, C2 and C3, brake B1, (one-way clutch OWC) and brake B2, thus varying the revolution speed of the output shaft O relative to that of the input shaft I. The four forward speed ratios and one reverse speed ratio are produced if the clutches C1, C2 and C3 and brakes B1 and B2 are engaged in the manner as shown in the following Table.

TABLE

| | C1 | C2 | C3 | B1 (OWC) | B2 | Gear Ratio | $\alpha^1 = 0.45$ $\alpha^2 = 0.45$ |
|---|---|---|---|---|---|---|---|
| 1st speed | o | | | o | | $\dfrac{1 + \alpha^2}{\alpha^2}$ | 3.22 |
| 2nd speed | o | | | | o | $\dfrac{\alpha^1 + \alpha^2}{\alpha^2(1 + \alpha^1)}$ | 1.38 |
| 3rd speed | o | o | | | | 1 | 1 |
| 4th speed | | o | | | o | $\dfrac{1}{1 + \alpha^1}$ | 0.69 |
| Reverse | | o | o | | | $\dfrac{1}{\alpha^1}$ | −2.22 |

In the above Table, a sign "o" denotes actuation state of the clutch or brake, $\alpha^1$ and $\alpha^2$ respectively denote ratios of number of teeth of the internal gears R1 and R2 to number of teeth of the corresponding sun gears S1 and S2. A gear ratio is a ratio of the revolution number of the input shaft I to that of the output shaft O. What is denoted by the label (OWC) below the brake B1 means that the first speed ratio is produced owing to the action of the one-way clutch OWC even if the brake B1 is not applied. However, in this first speed ratio, it is not possible for the output shaft O to drive the engine (that is, no engine braking is effected).

Figure 2A:
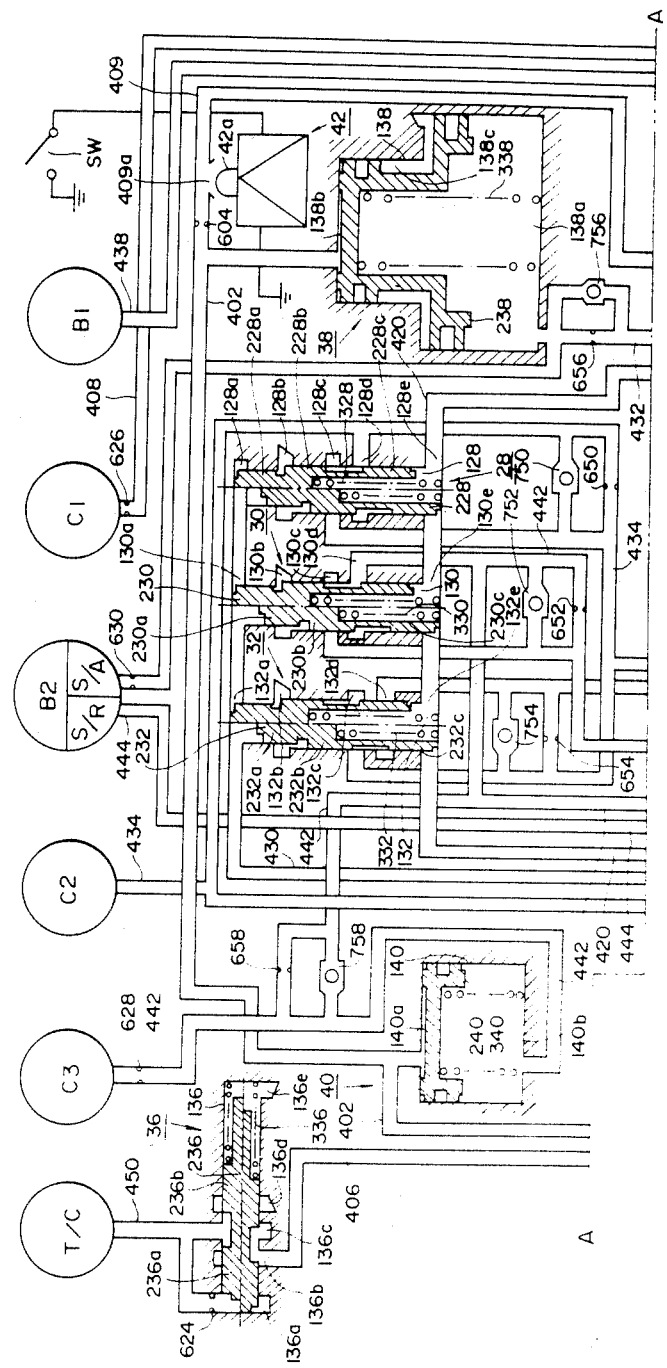
FIGS. 2(a), 2(b), and 2(c), when combined, illustrate a circuit diagram of a first embodiment of a hydraulic control system for the automatic transmission according to the present invention.
Figure 2B:
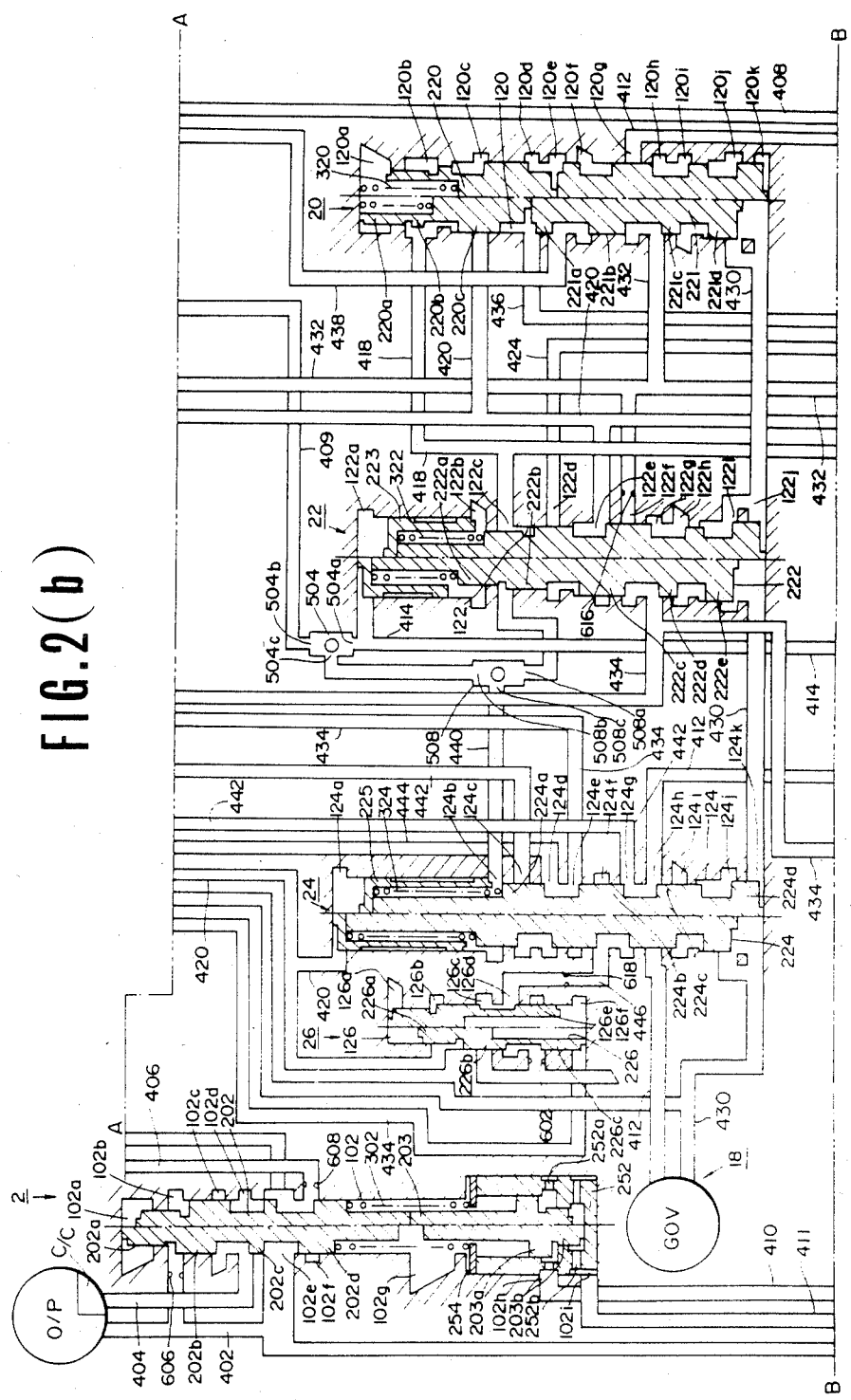
Figure 2C:
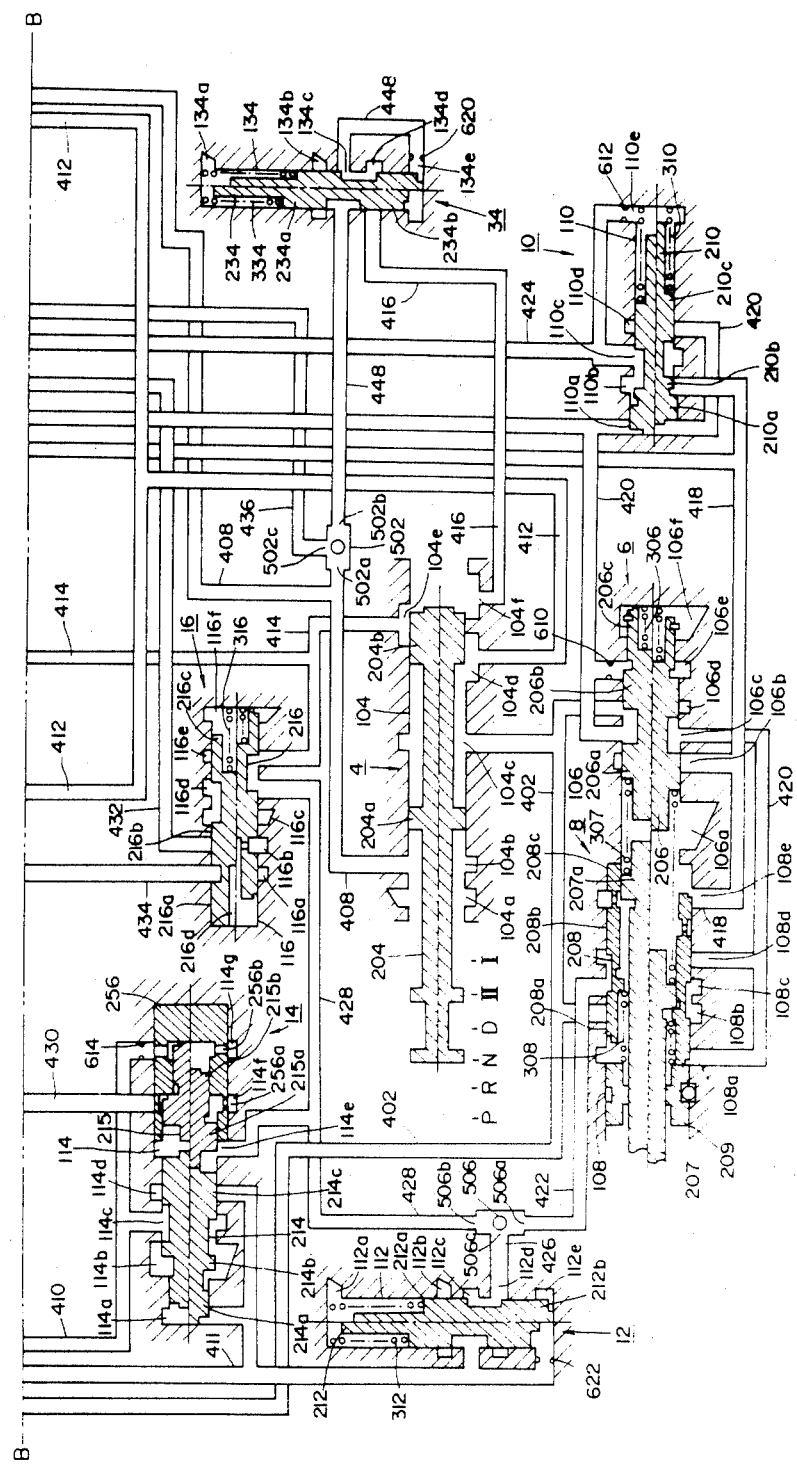

Referring to FIGS. 2(a), 2(b), and 2(c), a hydraulic control system for the above power transmission mechanism is described.

This hydraulic control system comprises a regulator valve 2, a manual valve 4, a throttle valve 6, a throttle fail safe valve 8, a throttle modulator valve 10, a pressure modifier valve 12, a cut back valve 14, a line pressure booster valve 16, a governor valve 18, a 1-2 shift valve 20, a 2-3 shift valve 22, a 3-4 shift valve 24, a 2-4 timing valve 26, a 2-3 timing valve 28, a 3-4 timing valve 30, a 3-2 timing valve 32, a first manual range pressure reducing valve 34, a torque converter pressure reducing valve 36, a 1-2 accumulator 38, a 4-3 accumulator 40, and an overdrive inhibitor solenoid 42. These valves are interconnected as shown in FIGS. 2(a), 2(b), and 2(c), and connected with an oil pump O/P, the torque converter T/C, clutches C1, C2 and brakes B1 and B2 as shown. The brake B2 has a servo apply chamber S/A, i.e., an oil pressure chamber designed to apply the brake when pressurized, and a servo release chamber S/R, i.e., an oil pressure chamber designed to release the brake when pressurized. Since the servo release chamber S/R has a larger pressure acting area than a pressure acting area of the servo apply chamber S/A, the brake B2 is released when the pressure is supplied to the servo release chamber S/R irrespective of the supply of oil pressure to the servo apply chamber S/A. The overdrive inhibitor solenoid 42 is electrically connected with an overdrive inhibitor switch SW.

The construction and operation of each of the valves are described.

Referring to FIG. 2(b), the regulator valve 2 comprises a valve bore 102 formed with nine ports 102a to 102i and a spool 202 having formed thereon four lands 202a to 202d slidably disposed in the valve bore 102. It also comprises a stationary sleeve 252, formed with two ports 252a and 252b, fixed relative to the valve bore 102, a spool 203 having formed thereon lands 203a and 203b slidably disposed in the stationary sleeve 252, and a spring 302 arranged between the land 202d of the spool 202 and a spring seat 254 mounted on the upper end of the sleeve 252 as viewed in FIG. 2(b). The lands 202b, 202c and 202d are the same in diameter, and the land 202a is smaller in diameter than these lands. The land 203a of the spool 203 is larger in diameter than the land 203b thereof. The ports 102a, 102c and 102g are drain ports. The ports 102b and 102e are connected with an oil conduit 402 (the line pressure circuit). An orifice 606 is provided in the inlet to the port 102b. The port 102d is connected via an oil conduit 404 with a variable volume chamber C/C of the oil pump O/P. The oil pump O/P is a vane pump of the variable volume discharge type and is designed to decrease the discharge rate of the oil flow in response to an oil pressure supplied to the oil chamber C/C. The port 102f is connected via an oil conduit 406 with a port 136b of a torque converter pressure reducing valve 36 shown in FIG. 2(a). An orifice 608 is provided in the oil conduit 406. The port 102h is connected via an oil conduit 410 with ports 114c and 114g of the cut back valve 14, while the port 102i is connected via an oil conduit 411 with ports 114a and 114d of the cut back valve 14 and also with ports 112c and 112e of the pressure modifier valve 12.

The regulator valve 2 regulates the line pressure in the oil conduit 402 in the following manner. Oil pressure from the port 102b acts on a differential area between the lands 202a and 202b of the spool 202, applying a downward force, as viewed in FIG. 2(b), to the spool 202. On the other hand, the spool 202 is subject to the sum of an upward force by the spring 302 and another upward force (which is later described) by the spool 203. Since the oil within the port 102e which the port 102b is connected with is adapted to be discharged to the port 102f, the oil pressure in the port 102b is regulated to a value at which the downward force created by the oil pressure in the port 102b balances with the sum of the two upward forces. If, as a result of an increase in the oil pressure in the port 102b, the downward force increases above the sum of the upward forces, the spool 202 slightly moves downward, forming a clearance between the land 202d and the port 102f, allowing the oil in the port 102e to flow via this clearance to the port 102f resulting in a reduction in the oil pressure in the port 102e which in turn results in a reduction in the oil pressure in the port 102b which communicates via the oil conduit 402 with the port 102e. The reduction in the oil pressure in the port 102b causes a reduction in the downward force, allowing the spool 202 to move back upward. After this action is repeated continuously, the oil pressure in the port 102b, i.e., the oil pressure in the oil conduit 402 is regulated to a value at which the downward force always balances with the sum of the upward forces. The oil pressure regulated in this manner (i.e., the line pressure) is variable with the upward force by the spool 203 because the force due to the spring 302 is constant. As shown, the ports 102h and 102i of the valve bore 102 register with the ports 252a and 252b of the sleeve 252, respectively. This permits an oil pressure in the oil conduit 410 acting on a differential area between the lands 203a and 203b of the spool 203 and an oil pressure in the oil conduit 411 to act on the bottom end of the land 203b, creating the above mentioned upward force with which the spool 203 urges the spool 202 upward. Therefore, the line pressure is regulated in response to the oil pressure in the oil conduit 410 and that in the oil conduit 411. The actual characteristic of the line pressure will be described later after the description of the associated valves is completed.

Referring to FIG. 2(c), the manual valve 4 comprises a valve bore 104 formed with six ports 104a to 104f and a spool 204 having formed thereon two lands 204a and 204b slidably disposed in the valve bore 104. The spool 204 is actuated by a shift lever disposed near a driver's seat, both not being illustrated, and is movable between six detent positions, i.e., a parking position "P", a reverse drive position "R", a neutral position "N", a forward automatic drive position "D", a manual second position "II", and a manual first position "I". The port 104a is a drain port, while the port 104b is connected via an oil conduit 408 with the clutch C1 at an fluid operated actuator therein, not shown, and also with a port 502a of a shuttle valve 502. The port 104c is connected with the before mentioned oil conduit 402 serving as the line pressure circuit. The port 104d is connected via an oil conduit 412 with a port 120g of the 1-2 shift valve 20, a port 124h of the 3-4 shift valve 24, and the governor valve 18. The port 104e is connected via an oil conduit 414 with a port 116e of the line pressure booster valve 16, a port 122a of the 2-3 shift valve 22 and a port 504a of a shuttle valve 504, both being shown in FIG. 2(b). The port 104f is connected via an oil conduit 416 with a port 134d of the manual first range pressure reducing valve 34. As shown in the following Table, the port 104c which is supplied with the line pressure is allowed to communicate with a port or ports indicated by the sign "o" in response to a position selected by the spool 204. The other port or ports which are not indicated by the sign "o" are drained.

TABLE

| Spool Range | Port | | | |
|---|---|---|---|---|
| | 104b | 104d | 104e | 104f |
| P | | | | |
| R | o | | | |
| N | | | | |

TABLE-continued

| Spool Range | Port | | | |
|---|---|---|---|---|
| | 104b | 104d | 104e | 104f |
| D | | o | | |
| II | | o | o | |
| I | | o | o | o |

Referring to FIG. 2(c), the throttle valve 6 comprises a valve bore 106 formed with six ports 106a to 106f and a spool 206 having formed thereon three lands 206a to 206c slidably disposed in the valve bore 106. A spring 306 is disposed in the valve bore 106 to bias the spool 206 leftward as viewed in FIG. 2(c). Also slidably disposed in the valve bore 106 is a plunger 207 operatively connected, via a linkage as shown in FIG. 4 with an accelerator pedal. Between the plunger 207 and the spool 206 is arranged a spring 307. The land 206c is smaller in diameter than the other two lands 206a and 206b. The ports 106a and 106f are drain ports. The port 106b is connected with an oil conduit 418, i.e., a kickdown pressure circuit, to receive a kickdown pressure (the same pressure as the line pressure) only when the accelerator pedal is depressed to a kickdown position thereof which will be described later. When the accelerator pedal is in the other positions, this port 106b is connected with the drain port 106a. The ports 106c and 106e are connected with an oil conduit 420, i.e., a throttle pressure circuit, and the port 106d is connected with the oil conduit 402, serving as the line pressure circuit. An orifice 610 is provided in the inlet to the port 106e.

With the throttle valve 6 thus constructed, an oil pressure in the ports 106c and 106e is obtained after a well known pressure regulation is carried out using the line pressure in the port 106d as a source of pressure until the sum of a leftward force by the spring 306 and a leftward force created by the oil pressure in the port 106e acting on the differential area between the lands 206b and 206c balances with a rightward force by the spring 307. Thus, the oil pressure proportional to the bias force of the spring 307 builds up in the oil conduit 420. However, since the bias force of the spring 307 is varied by the plunger 207 operated by the accelerator pedal, the oil pressure, i.e., a throttle pressure, in the oil conduit 420 is proportional to the depression degree of the accelerator pedal or the throttle opening degree of the throttle valve mounted in an intake passage of the engine. The characteristic of the throttle pressure is illustrated by the solid line drawn curve shown in FIG. 3. Under kickdown condition, the throttle valve 6 is pushed inwardly by the plunger 207 via the spring 307 to the right as viewed in FIG. 2(c) to the upper half position thereof so that it ceases its pressure regulating function. Under this condition, the line pressure is supplied also to the oil conduit 420 and past a port 108e to the oil conduit 418 and to the port 106b which served as a drain port.

The throttle fail safe valve 8 comprises a valve bore 108 connected with and formed coaxially with the valve bore 106 of the throttle valve 6. The valve bore 108 is formed with five ports 108a to 108e and slidably receives therein a sleeve 208 having formed thereon three lands 208a to 208c. The throttle fail safe valve 6 also comprises the before mentioned plunger 207, the land 207a of which is slidably disposed in the sleeve 208 for axial movement, a plug 209 closing the open end of valve bore 108, and a spring 308 arranged between the plug 209 and the sleeve 208. The end plug 209 is formed with an aperture which allows the plunger 207 to pass through. The ports 108a and 108d of the valve bore 108 are connected with the oil conduit 420 which serves as the throttle pressure circuit, and the port 108b is connected with the oil conduit 402 which serves as the line pressure circuit. The port 108c is connected via the oil conduit 422 with a port 506a of a shuttle valve 506. The port 108e is connected with the oil conduit 418, i.e., the before mentioned kickdown circuit.

The throttle fail safe valve 8 thus constructed functions to alleviate the force required to push the plunger 207 inwardly, so the accelerator pedal is prevented from being excessively loaded by the spring 307 when the pedal is depressed. The throttle pressure supplied to the port 108a enters into the inside of the sleeve 208, acting on the land 207a of the plunger 207, thus applying to the plunger 207 the rightward force which assists the depressing movement of the plunger 207. Thus, the force required to push the plunger 207 by compressing the spring 307 is alleviated, alleviating the depressing force of the accelerator pedal. Irrespective of the fact that the reaction force of the spring 307 increases as the spring 307 is compressed, substantially constant accelerator pedal depression force is maintained because the throttle pressure increases as the spring 307 is compressed and the force derived from the throttle pressure to push the plunger 207 also increases. Under the kickdown condition, the plunger 207 is pushed inwardly to the position illustrated by the upper half thereof as viewed in FIG. 2(c), allowing port 108e to communicate with the port 108a via the inside of the sleeve 208, thus allowing the oil pressure in the oil conduit 420 to be supplied to the oil conduit 418. Because, under the kickdown condition, the spool 206 of the throttle valve 6 is also pushed inwardly to the position illustrated by the upper half position thereof wherein the port 106d is allowed to communicate with the port 106c, the oil conduit 420 which normally serves as the throttle pressure circuit and has been supplied with the throttle pressure, is now supplied with the line pressure. Consequently, the line pressure develops also in the oil conduit 418. Since the sleeve 208 is biased by the spring 308 to stay in the rightward limit position thereof as illustrated by the upper half position thereof wherein ports 108c and 108d are allowed to communicate with each other via a groove between the lands 208a and 208b of the sleeve 208, the oil pressure in the oil conduit 420 is admitted to the oil conduit 422. Normally, the throttle pressure develops in the oil conduit, but the line pressure develops under the kickdown condition. If a throttle valve operating cable interconnecting the accelerator pedal with the plunger 207 should be disconnected or broken, the plunger 207 would be pulled outwardly by a return spring, not shown, to move leftwardly as viewed in FIG. 2(c). This leftward movement of the plunger 207 causes the sleeve 208 to move to the position indicated by the lower half thereof viewing in FIG. 2(c). Thus, the port 108b communicates with the port 108c, supplying the line pressure to the oil conduit 422 from the oil conduit 402, causing the line pressure to rise to a peak value thereof, which will be described later. Therefore, the transmission is prevented from becoming burned or damaged due to low line pressure in the event the throttle valve operating cable is disconnected or broken. The automotive vehicle is therefore enabled to travel (such as to a repair shop) without causing a slip in clutches and brakes. The throttle valve operating mechanism employed here is disclosed and illustrated in FIG. 4 of U.S. Pat. No. 4,301,697 issued on Nov. 24, 1981 to Kazuyoshi IWANAGA et al. and assigned to Nissan Motor Company, Limited.

Referring to FIG. 2(c), the throttle modulator valve 10 comprises a valve bore 110 formed with five ports 110a to 110e, a spool 210 having formed thereon three lands 210a to 210c slidably disposed in the valve bore 110, and a spring 310 biasing the spool 210 leftwardly as viewed in FIG. 2(c). The land 210a is larger in diameter than the diameter of the lands 210b and 210c. The ports 110a and 110d are connected with the oil conduit 420 which serves as the throttle pressure circuit, while the port 110b is connected with the oil conduit 418 which serves as the kickdown circuit. The ports 110c and 110e are connected via an oil conduit 424 with a port 122d of the 2-3 shift valve 22 shown in FIG. 2(b). The port 110e is provided with an orifice 612 at an inlet thereof.

With the throttle modulator valve 10 thus constructed, since, when not under the kickdown condition, the port 110b is a drain port via an oil conduit 418, a pressure regulation is effected with the port 110d (which is supplied with the throttle pressure) as a high pressure side port and the port 110b as a drain port. The equilibrium state of the spool 210 is accomplished when a rightwardly directed force due to the oil pressure (throttle pressure) in the port 110a acting on the lange 210a balance with the sum of a leftwardly directed force derived from an oil pressure in the port 110e acting upon the land 210c and a leftwardly directed force due to the spring 310. Therefore, the oil pressure in the port 110e (this oil pressure hereinafter being called as "throttle modulator pressure") varies depneding upon the throttle pressure and reveals a characteristic as shown in FIG. 3. This throttle modulator pressure is sent via the above mentioned oil conduit 424 to the 2-3 shift valve 22 to control same. Under the kickdown condition, the port 110b which has been a drain port is supplied with the kickdown pressure (line pressure) and thus the throttle modulator valve 10 is moved to the upper half position thereof and ceases its pressure regulating function, allowing the line pressure to appear in the oil conduit 424.

The pressure modifier valve 12 comprises a valve bore 112 formed with five ports 112a to 112e, a spool 212 having formed thereon the same diameter lands 212a and 212b slidably disposed in the valve 112, and a spring 312 which biases the spool 212 downward viewing in FIG. 2(c). The ports 112a and 112b are both drain ports. The ports 112c and 112e are connected via the above mentioned oil conduit 411 with the port 102i of the regulator valve 2, while the port 112d is connected via the oil conduit 426 with a port 506c of a shuttle valve 506. The port 112e is provided with an orifice 622 at an inlet thereof. With the pressure modifier valve 12 thus constructed, a pressure regulating function is effected with the port 112d (which is supplied with the throttle pressure or the line pressure as will be later described) as a high pressure port and with the port 112b as a drain port. The equilibrium state of the spool 212 is accomplished when an upward force, as viewed in FIG. 2(c), derived from an oil pressure in the port 112e acting on the land 212b balances with a downward force due to the spring 312. Thus, the oil pressure in the port 112e (this pressure being hereinafter called as "pressure modifier pressure") has a constant value which is determined by the force of the spring 312. However, when the oil pressure supplied to the port 112d is low so that the upward force does not overcome the force by the spring 312, the pressure modifier valve 12 stays in the right half position thereof wherein the pressure regulating function is not effected, admitting the oil pressure in the port 112d to the oil conduit 411. Thus, the oil pressure in the oil conduit 411 becomes equal to the oil pressure in the oil conduit 426. Normally i.e., when the throttle valve operating cable is disconnected or broken nor when the manual valve 4 is not placed in the "II" position, the throttle pressure is supplied via the port 108c of the throttle fail safe valve 8, the oil conduit 422, the shuttle valve 506 and the oil conduit 426 to the port 112d, thus providing the pressure modifier pressure which exhibits a characteristic as shown in FIG. 4. If the throttle valve operating cable should be disconnected or broken, the throttle fail safe valve 8 operates in the manner described before, allowing the line pressure to be supplied to the oil conduuit 422, thus keeping the pressure modifier pressure constant. As will be later described, if the manual valve 4 is moved from the "D" position to "II" position, since the line pressure is supplied from the line pressure booster valve 16 via the oil conduit 428 to the port 506b of the shuttle valve 506, the line pressure is supplied to the port 112d irrespective of the value of the throttle pressure within the oil conduit 422, thus allowing the pressure modifier pressure to increase to the constant value. Since the pressure modifier pressure is introduced to the port 102i of the regulator valve 2 via the oil conduit 411, the line pressure increases in accordance with the magnitude of the pressure modifier pressure. The pressure modifier pressure is fed also to the cut back valve 14.

Figure 5:
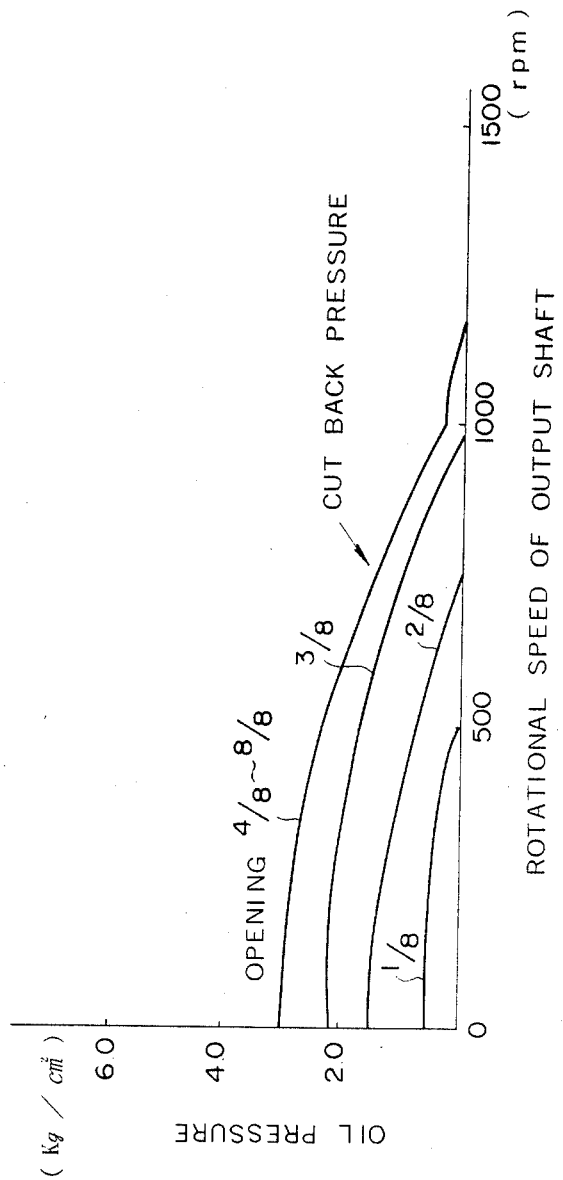
FIG. 5 is a graph showing the variation in a cut back pressure versus rotational speed of a transmission output shaft for different degrees of throttle opening.

The cut back valve 14 comprises a valve bore 114 formed with seven ports 114a to 114g and a spool 256 having formed thereon three lands 214a to 214c slidably disposed in the valve bore 114. It also comprises a sleeve 256 formed with ports 256a and 256b in registry respectively with the ports 114f and 114g, and a spool 215 having formed thereon two lands 215a and 215b slidably disposed in the sleeve 256. The land 214a of the spool 214 is smaller in diameter than the lands 214b and 241c. The land 215a of the spool 215 is larger in diameter than the land 215b. The ports 114a and 114d are connected with the oil conduit 411 and are supplied with the before mentioned pressure modifier pressure. The port 114b is a drain port. The ports 114c and 114g are connected with an oil conduit 410, the port 114e is connected with the oil conduit 428, and the port 114f is connected with an oil conduit 430 which serves as a governor pressure circuit. The port 114g is provided with an orifice 614 at an inlet thereof. The cut back valve 14 thus constructed performs a pressure regulating function with the port 114d as a high pressure pot and with the port 114b as a drain port when the manual valve 4 is not placed in "II" position or the line pressure booster valve 16 is in the upper half position thereof as viewed in FIG. 2(c) (i.e., when the oil conduit 428 is a drain oil conduit). Under this condition, the spools 214 and 215 move as if they were one piece and assume an equilibrium state when a rightwardly directed force derived from the pressure modifier pressure in the port 114a acting on the land 214a balances with the sum of a leftwardly directed force derived from an oil pressure in the port 114g acting on the land 215b and a leftwardly directed force derived from an oil pressure (governor pressure) in the port 114f acting on a differential area between the lands 215a and 215b. As the governor pressure rises, the oil pressure in the port 114g (which oil pressure is hereinafter called as "cut back pressure")
drops and when the governor pressure rises further beyond a predetermined value, the cut back valve 14 is moved to the lower half position thereof as viewed in FIG. 2(c), reducing the cut back pressure to zero. The cut back pressure drops as the pressure modifier pressure drops. The characteristic of this cut back pressure is illustrated in FIG. 5. Since the cut back pressure is introduced to the port 102h of the regulator valve 2 via the oil conduit 410, the line pressure drops as the governor pressure rises and it drops as the pressure modifier pressure drops. If the manual valve 4 is moved from the "D" position to the "II" position, the line pressure is supplied to the port 114e of the cut back valve 14 via the oil conduit 428, thus urging the spool 214 to move to the leftward limit position as viewed in FIG. 2(c). Consequently, the port 114c is allowed to communicate with the port 114b which is a drain port, so the oil pressure in the oil conduit 410 drops to zero irrespective of the value of the governor pressure nor that of the pressure modifier pressure.

Figure 6:
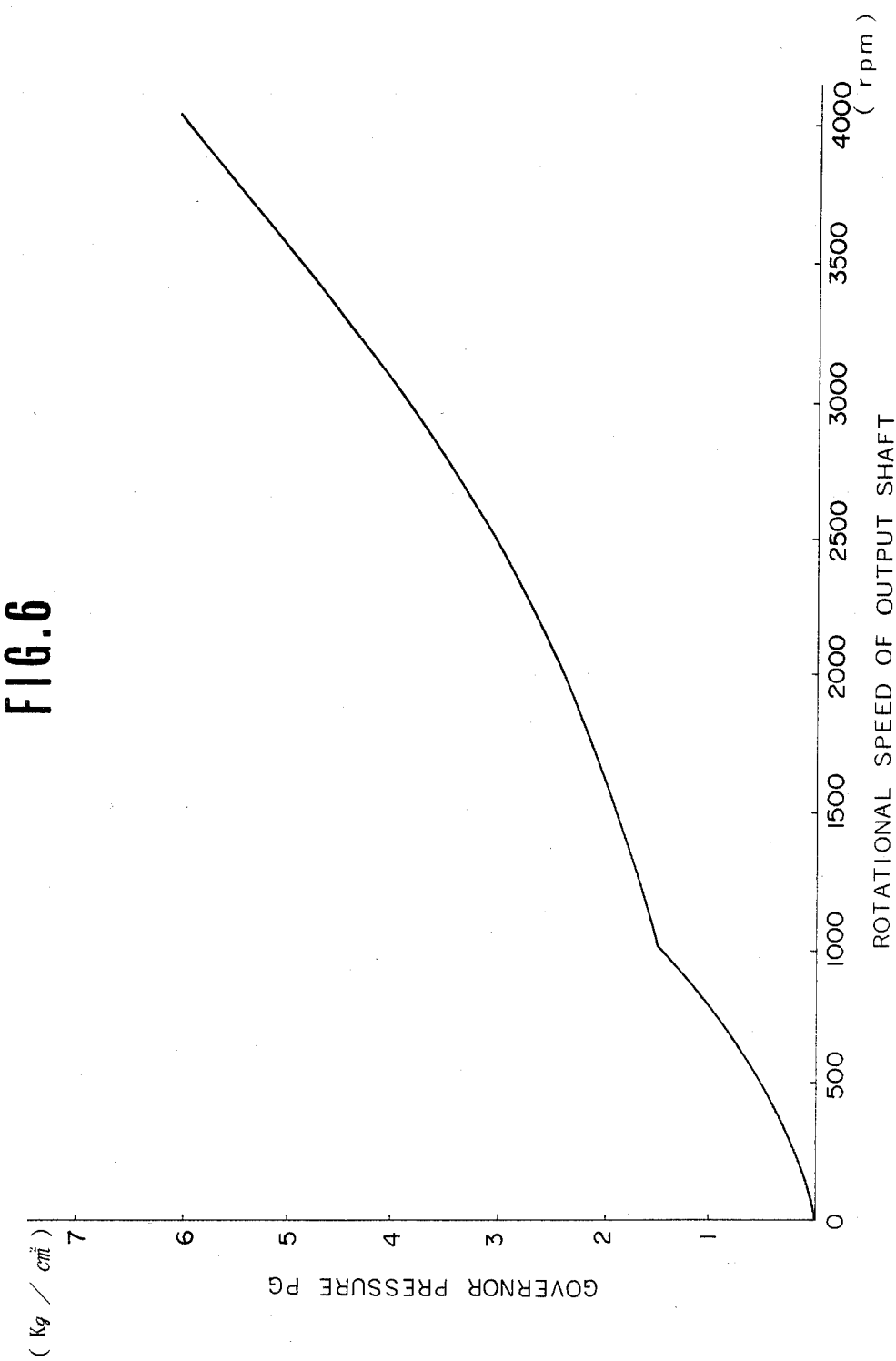
FIG. 6 is a graph showing the variation in a governor pressure versus rotational speed of the transmission output shaft.

The line pressure booster valve 16 comprises a valve bore 116 formed with six ports 116a to 116f, a spool having formed thereon three lands 216a to 216c slidably disposed in the valve bore 116, and a spring 316 biasing the spool 216 leftwardly as viewed in FIG. 2(c). The lands 126a to 216c are of the same diameter land. The spool 216 is formed with a bore 216d which communicates with a groove between the lands 216a and 216b with the left end of the spool 216. The ports 116c and 116f are drain ports. The port 116d connected with the oil conduit 428, and the port 116e is connected with the oil conduit 414. The port 116b is connected via the oil conduit 432 with a port 120h of the 1-2 shift valve 20 shown in FIG. 2(b), which port 120h is adapted to be supplied with the line pressure when the 1-2 shift valve 20 is in the second speed ratio position (an upshift position thereof). The port 116a is connected via an oil conduit 434 with a port 122g of the 2-3 shift valve 22, which port 122g is adapted to be supplied with the line pressure when the 2-3 shift valve 22 is in the third speed ratio position (an upshift position thereof). The line pressure booster valve 16 thus constructed operates in a different manner in a case where the 2-3 shift valve 22 is moved from the second speed ratio position (the downshift position thereof) to the third speed ratio position from a case wherein it is moved from the third speed ratio position to the second speed ratio position. That is, when the 1-2 shift valve 20 is in the first speed ratio position or the second speed ratio position, the spool 216 of the line pressure booster valve 16 stays in the upper half position thereof as viewed in FIG. 2(c) by the action of the spring 316. When the 1-2 shift valve 20 is in the second speed ratio position, the line pressure is supplied to the port 116b. This, however, does not cause the line pressure booster valve 16 to shift its position because the land 216b blocks the port 116b. In this state, the port 116d communicates with the drain port 116c. When, subsequently, the 2-3 shift valve 22 is moved to the third speed ratio position, the line pressure is supplied to the oil conduit 434. The line pressure in the oil conduit 434 passes through the port 116a and the bore 216d of the spool 216 to act on the left end face of the spool 216, urging the spool 216 to move against the spring 316 rightwardly to the lower half position thereof as viewed in FIG. 2(c). In this position of the spool 216, the port 116b is allowed to communicate with the bore 216d of the spool 216, while the port 116a is blocked by the land 216a, so that the pressure in the oil conduit 432 now acts on the left end face of the spool 216. Thus, the line pressure booster valve 16 stays in the lower half position thereof even after the 2-3 shift valve 22 subsequently returns to the second speed ratio position thereof. Even if the line pressure booster valve 16 is moved to the lower half position thereof, the oil conduit 428 continues to be drained via the port 116d, port 116e and oil conduit 414 to the port 104e as long as the manual valve 4 is not in the "II" or "I" position wherein the port 104e of the manual valve 4 is a drain port. However, when the manual valve 4 is placed in the "II" or "I" position, since the line pressure is supplied to the oil conduit 414, the line pressure is supplied via the ports 116e and 116d to the oil conduit 428. The line pressure in the oil conduit 428 is supplied via the shuttle valve 506 to the port 112d of the pressure modifier valve 12, rendering the pressure modifier valve 12 to boost the line pressure. Therefore, in the case where the manual valve 4 is moved to the "II" position or "I" position while the vehicle is travelling in the third speed ratio in order to effect a forced downshift to the second speed ratio to obtain effective engine braking, the line pressure is boosted high enough to provide the swift downshift and effective engine braking. If the 1-2 shift valve 20 is moved to the first speed ratio position, since the oil pressure in the oil conduit 432 disappears, the line pressure booster valve 16 returns to the upper half position thereof, ceasing its function to boost the line pressure. The governor valve 18 is installed to rotate with the ouput shaft O of the automatic transmission and effects pressure regulation using the line pressure (i.e., the line pressure being fed to the governor valve 18 when the manual valve 4 is in the "D" position, "II" position or "I" position) so as to supply an oil pressure (governor pressure) variable with the vehicle speed. The governor pressure reveals a characteristic as shown in FIG. 6.

Referring to FIG. 2(b), the 1-2 shift valve 20 comprises a valve bore 120 formed with eleven ports 120a to 120k, two spools 220 and 221 slidably disposed in the valve bore 120, and a spring 320 biasing the spool 220 downward as viewed in FIG. 2(b). The spool 220 is formed with three lands 220a to 220c which are larger in diameter in this sequence, while the spool 221 is formed with lands 221a to 221d (the lands 221a to 221c are the same in diameter, but the land 221d is larger in diameter than the former three). The ports 120a, 120f and 120i are drain ports. The port 120b is connected with the oil conduit 418 serving as the kickdown pressure circuit. The port 120b is arranged such that the oil pressure therein acts on a differential area between the lands 220a and 220b when the spool 220 is in the down position thereof indicated by the right half position thereof viewing in FIG. 2(b), urging the spool 220 downward, and acts on a differential area between the lands 220a and 220c when the spool 220 is in the up position thereof indicated by the left half position thereof viewing in FIG. 2(b), urging the spool 220 downward. The port 120c is connected with the oil conduit 420 serving as the throttle pressure circuit. The port 120c is arranged such that the oil pressure therein acts on a differential area between the lands 220b and 220c when the spool 220 is in the down position thereof so as to urge the spool 220 downward, but no downward force is provided when the spool 220 is in the up position thereof because the oil pressure acts on the circumference of the land 220c. The ports 120j and 120k are connected with the oil conduit 430 which serves as the governor pressure circuit. These ports are arranged such that the governor pressure acts on an area (which is equal to the area of the land 221c) resulting from subtracting a differential area between the lands 221d and 221c from the area of the land 221d when the spool 221 is in the downshift position thereof, urging the spool 221 upwardly, and acts on the area of the land 221d when the spool 221 is in the upshift position thereof, urging the spool 221 upward. The port 120g which is connected with the oil conduit 412 is blocked by the land 221b when the spool 221 is in the downshift position thereof, while it communicates via the port 120h with the oil conduit 432 when the spool 221 is in the upshift position thereof. The oil conduit 432 is connected with the servo apply chamber S/A of the brake B2 shown in FIG. 2(a). The port 120d is connected via the oil conduit 436 with the port 502c of the shuttle valve 502 shown in FIG. 2(c). The port 102d is adapted to communicate with the port 120e when the spool 221 is in the downshift position thereof. The port 120e is connected via an oil conduit 438 with the brake B1 shown in FIG. 2(a). With the 1-2 shift valve 20 thus constructed, the supply of the pressurized oil to the servo apply chamber S/A and the brake B1 is controlled depending upon the downshift position of the spool 221 or upshift position thereof, the further detail being described later.

The 2-3 shift valve 22 comprises a valve bore 122 formed with ten ports 122a to 122j, a spool 222 having formed thereon five lands 222a to 222e slidably disposed in the valve bore 122, a plug 223 axially slidable near the closed end in the valve bore 122, and a spring 322 arranged between the spool 222 and the plug 223. The lands 222a to 222c are larger in diameter in this sequence, the land 222c is the same in diameter as the land 222d, and the land 222e is larger in diameter than the former two. The ports 122b and 122h are drain ports. The port 122a is connected with the oil conduit 414 (which is supplied with the line pressure when the manual valve 4 is in the "II" position or "I" position), and is arranged such that the oil pressure therein acts on the upper end face of the plug 223. The port 122c is connected with the oil conduit 418 serving as the kickdown pressure circuit and is arranged such that the oil pressure in the port 122c acts on a differential area between the lands 222a and 222b of the spool 222, urging the spool 222 downward as viewed in FIG. 2(b). The port 122d is supplied with a throttle modulator pressure from the oil conduit 424 and is arranged such that the throttle modulator pressure acts on a differential area between the lands 222b and 222c when the spool 222 is in the upshift position thereof, urging the spool 222 downward as viewed in FIG. 2(b). The port 122e is supplied with a throttle pressure from the oil conduit 420 and is arranged such that the throttle pressure acts on a differential area between the lands 222b and 222c of the spool 222 when the spool 222 is in a downshift position thereof, urging the spool 222 downward. The ports 122e and 122j are supplied with the governor pressure from the oil conduit 430, and they are arranged such that the governor pressure acts on an area (i.e., the area of the land 222d) resulting from subtracting a differential area between the lands 222e and 222d from the area of the land 222e when the spool 222 is in the downshift position thereof, urging the spool 222 upward, while it acts on the area of the land 222e when the spool 222 is in the upshift position thereof, urging the spool 222 upward. The port 122f provided with an orifice 616 at its inlet is connected with the oil conduit 432, and the port 122g is connected with the oil conduit 434. These ports 122f and 122g are arranged such that they communicate with each other when the spool 222 is in the upshift position thereof. The oil conduit 434 is connected with the clutch C2 shown in FIG. 2(a). With the 2-3 shift valve 22 thus constructed, the supply of pressurized oil to the clutch C2 is controlled depending upon the downshift or upshift position of the spool 222, the further detail being described later.

The 3-4 shift valve 24 comprises a valve bore 124 formed with eleven ports 124a to 124k, a spool 224 having formed thereon four lands 224a to 224d slidably disposed in the valve bore 124, a plug 225 axially slidable in the valve bore 124 near the closed end thereof, and a spring 324 arranged between the spool 224 and the plug 225. The lands 224a to 224c are the same in diameter and the land 224d is larger in diameter than the former lands. The port 124a is connected with the oil conduit 420 which serves as the throttle pressure circuit and is arranged such that the oil pressure in the port 124a acts on the end face of the plug 225 so as to urge the plug 225 downward as viewed in FIG. 2(b). The port 124b is connected via an oil conduit 440 with a port 508c of a shuttle valve 508. The oil pressure in this port 124b always acts on the upper side of the land 224a so as to urge the spool 224 downwardly. The port 124c is connected via an oil conduit 442 with the clutch C3 shown in FIG. 2(a). This port 124c is allowed to communicate with the port 124d which is connected via the oil conduit 444 with the servo release chamber S/R of the brake B2 shown in FIG. 2(a) when the spool 224 is in the upshift position thereof. When the spool 224 is in the downshift position thereof, the port 124d communicates with the port 124e which is connected via the oil conduit 434 with the clutch C2. The port 124f is connected via an oil conduit 446 with a port 126d of the 2-4 timing valve 26, while the port 124g is connected with the oil conduit 442. The ports 124f and 124g are allowed to communicate with each other when the spool 224 is in the upshift position thereof. The port 124g, on other hand, is allowed to communicate with the port 124h which is connected with the oil conduit 412 when the spool 224 is in the downshift position thereof. The port 124i is a drain port. The ports 124j and 124k are connected with the oil conduit 430 which serves as the governor pressure circuit. Similarly to the before mentioned 1-2 shift valve 20 and 2-3 shift valve 22, the ports 124j and 124k are arranged such that the governor pressure acts on the area of the land 224c when the spool 224 is in the downshift position thereof, urging the spool 224 upward, while when the spool 224 is in the upshift position thereof, the governor pressure acts on the area of the land 224d, urging the spool 224 upward. With the 3-4 shift valve 24 thus constructed, the supply of pressurized oil to the clutch C3 and the servo release chamber S/R is controlled depending upon the downshift position or upshift position of the spool 224.

The 2-4 timing valve 26 comprises a valve bore 126 formed with six ports 126a to 126f and a spool 226 having formed thereon three lands 226a to 226c slidably disposed in the valve bore 126. The lands 226b and 226c are the same in diameter, and the land 226a is smaller in diameter than the former two. The ports 126a, 126c, and 126e are drain ports, respectively. The port 126e is provided with an orifice 602. An orifice 618 is provided in an oil conduit 446. The port 126b is supplied with the throttle pressure from the oil conduit 420 which serve as the throttle pressure circuit and is arranged such that the throttle pressure in the port 126b always acts on a differential area between the lands 226a and 226b so as to always urge the spool 226 downward. The port 126d is connected with the oil conduit 446 and is allowed to communicate with the port 126e when the spool 226 is in the down position thereof, but is allowed to communicate with the port 126c when the spool 226 is in the up position thereof. The port 126f is connected via the oil conduit 434 with the clutch C2. With the 2-4 timing valve 26 thus constructed, the pressurized oil is supplied to the clutch C2 and the pressurized oil from the clutch C3 is discharged at proper timing during 2-4 shift, further detail being described later.

Referring to FIG. 2(a), the 2-3 timing valve 28 comprises a valve bore 128 formed with five ports 128a to 128e, a spool 228 having formed thereon three lands 228a to 228c slidably disposed in the valve bore 128, and a spring 328 biasing the spool 228 upwardly as viewed in FIG. 2(a). The port 128a is supplied with the governor pressure from the oil conduit 430 so as to urge the spool 228 downward. As opposed to this force, the throttle pressure is supplied to the port 128e from the oil conduit 420 so as to urge the spool 228 upward. The port 128b is a drain port. The port 128c is connected with a portion of the oil conduit 434 upstream of the check valve 750 and an orifice 650 (they are arranged in parallel), i.e., which portion is disposed on the side near the 2-3 shift valve 22, while the port 128d is connected with a portion of the oil conduit 434 downstream of the check valve 750 and the orifice 650 (a portion on the side near the clutch C2). With the 2-3 timing valve 28 thus constructed, the pressurized oil to be supplied to the clutch C2 is controlled depending upon the magnitude of the throttle pressure and that of the governor pressure so that the clutch C2 is engaged at proper timing during 2-3 shift.

The 3-4 timing valve 30 comprises a valve bore 130 formed with five ports 130a to 130e, a spool 230 having formed thereon three lands 230a to 230c slidably disposed in the valve bore 130, and a spring 330 biasing the spool 230 upward as viewed in FIG. 2(a). The port 130a is supplied with the governor pressure from the oil conduit 430 so as to urge the spool 230 downward. As opposed to this force, the throttle pressure is supplied to the port 130e from the oil conduit 420 so as to urge the spool 230 upward. The port 130b is a drain port. The ports 130c and 130d are both connected with the oil conduit 442. The port 130c is connected with a portion of the oil conduit 442 upstream of a check valve 752 and an orifice 652 (they are arranged in parallel), i.e., which portion is disposed on the side near the port 124c of the 3-4 shift valve 22, while the port 130d is connected with the downstream portion which is disposed on the side near the clutch C3. With the 3-4 timing valve 30 thus constructed, the pressurized oil to be discharged from the clutch C3 is controlled depending upon the magnitude of the throttle pressure and that of the governor pressure so as to release the clutch C3 in proper timing during 3-4 shift.

The 3-2 timing valve 32 comprises a valve bore 132 formed with five ports 132a to 132e, a spool 232 having formed thereon three lands 232a to 232c slidably disposed in the valve bore 132, and a spring 332 biasing the spool 232 upward as viewed in FIG. 2(a). The port 132a is supplied with the governor pressure from the oil conduit 430 so as to urge the spool 232 downward. On the other hand, as opposed to this force, the throttle pressure is supplied to the port 132e from the oil conduit 420 so as to urge the spool 230 upward. The port 132b is a drain port. The ports 132c and 132d are both connected with the oil conduit 434. The port 132c is connected with a portion of the oil conduit 434 upstream of a check valve 754 and an orifice 654 (they are arranged in parallel) which portion is disposed on the side directly connected with the port 122g of the 2:3 shift valve 22, while, the port 132d is connected with the downstream portion of the oil conduit 434 which is disposed on the side directly connected with the port 124e of the 2-3 shift valve 24. With the 3-2 timing valve 32 thus constructed, the pressurized oil to be discharged from the clutch C2 is controlled depending upon the magnitude of the throttle pressure and that of the governor pressure so as to release the clutch C2 at proper timing during 3-2 shift.

Referring to FIG. 2(c), the manual first range pressure reducing valve 34 comprises a valve bore 134 formed with five ports 134a to 134e, a spool 234 having formed thereon two lands 234a and 234b, and a spring 334 biasing the spool 234 downward. The ports 134a and 134b are drain ports. The port 134d is connected with the oil conduit 416 which is supplied with the line pressure when the manual valve 4 is in the "I" position, while the ports 134c and 134e are connected with the oil conduit 448. The port 134e is provided with an orifice 620 at an inlet thereof. With the manual first range pressure reducing valve 34, a pressure regulation is effected with the port 134b as a high pressure port and with the port 134b as a drain port until the oil pressure in the port 134e balances with the force of the spring 334. Thus, the manual first range pressure reducing valve 34 functions to produce a predetermined constant oil pressure in the oil conduit 448 which results from reducing the line pressure when the line pressure appears in the oil conduit 416.

Referring to FIG. 2(a), the torque converter pressure reducing valve 36 comprises a valve bore 136 formed with five ports 136a to 136e, a spool 236 having formed thereon two lands 236a and 236b, and a spring 336 biasing the spool 236 leftwardly as viewed in FIG. 2(a). The ports 136d and 136e are drain ports. The port 136b is connected with the oil conduit 406 which is supplied with pressurized oil discharged from the port 102f of the regulator valve 2, while the ports 136a and 136c are connected via the oil conduit 450 with the torque converter T/C. The port 136a is provided with an orifice 624 at an inlet thereof. With the torque converter pressure reducing valve 36 thus constructed, a pressure regulation is effected with the port 136b as a high pressure port and with the port 136b as a drain port until the force created by the oil pressure in the port 136a balances with the force of the spring 336. Therefore, the torque converter pressure reducing valve 36 functions to provide a constant pressurized pressure to the torque converter T/C irrespective of the variation in oil pressure in the oil conduit 406.

The 1-2 accmulator 38 comprises a stepped cylindrical bore 138, a piston 238 slidably disposed in the bore 138, and a spring 338 biasing the piston upwardly as viewed in FIG. 2(a). A chamber 138a defined by the larger diameter side of the piston 238 is connected with the oil conduit 432, a chamber 138b defined by the smaller diameter side of the piston 238 is connected with the oil conduit 402 (line pressure circuit), and an intermediate chamber 138c is a drain chamber. An orifice 656 and a check valve 756 are provided in parallel at that portion of the oil conduit 432 which is disposed upstream of the 1-2 accumulator 38 and the servo apply chamber S/A. The 1-2 accumulator 38 thus constructed functions to allow a gradual rise in the oil pressure in the oil conduit 432 (i.e., the oil pressure in the servo apply chamber S/A) so as to effect a smooth 1-2 shift.

The 4-3 accumulator 40 comprises a cylindrical bore 140, a piston 240 slidably disposed in the cylindrical bore 140, and a spring 340 biasing the piston 240 upward as viewed in FIG. 2(a). An upper side chamber 140a defined by the piston 240 is connected with the oil conduit 402 (the line pressure circuit), while the lower side chamber 140b is connected with the oil conduit 442 which communicates with the clutch C3. A check valve 758 and an orifice 658 are arranged in parallel at a portion of the oil conduit 442 which is disposed upstream of the clutch C3 and the 4-3 accumulator 40. The 4-3 accumulator 40 thus constructed functions to allow a gradual rise in the oil pressure in the oil conduit 442 (the oil pressure in the clutch C3) so as to effect a smooth 4-3 shift and so as to alleviate a shock upon moving the manual valve 4 from the "N" position to the "D" position.

Referring to FIG. 2(a), the overdrive inhibitor solenoid 42 is provided to face an opening 409a formed in an oil conduit 409 which is connected at one end thereof with the oil conduit 402 serving as the line pressure circuit and it comprises a rod 42a arranged to close the opening 409a when the solenoid 42 is energized. The oil conduit 409 is connected with a port 504b of a shuttle valve 504. The overdrive inhibitor solenoid 42 is energized by the overdrive inhibitor switch SW operable from a driver's seat. When the switch SW is in the off state thereof, the oil flowing into the oil conduit 409 from the oil conduit 402 is discharged from the opening 409a, so no pressure develops in the oil conduit 409. As will be noted, since the area of the orifice 604 is small enough, the line pressure in the oil conduit 402 is not affected even if the oil is discharged from the opening 409a. When the switch SW is turned on and the rod 42a closes the opening 409a, the oil conduit 409 is subject to the same pressure, i.e., the line pressure, as that in the oil conduit 402. As a result, the 3-4 shift valve 24 is held in the downshift position thereof as will be described later, thus preventing an upshift to the fouth speed ratio (overdrive).

The clutches C1, C3, and the servo apply chamber S/A are provided with orifices 626, 628 and 630 at inlets thereof, respectively.

Hereinafter, the operation of the hydraulic control system is described.

The line pressure obtained by the pressure regulation in the regulator valve 2 is described.

Figure 7:
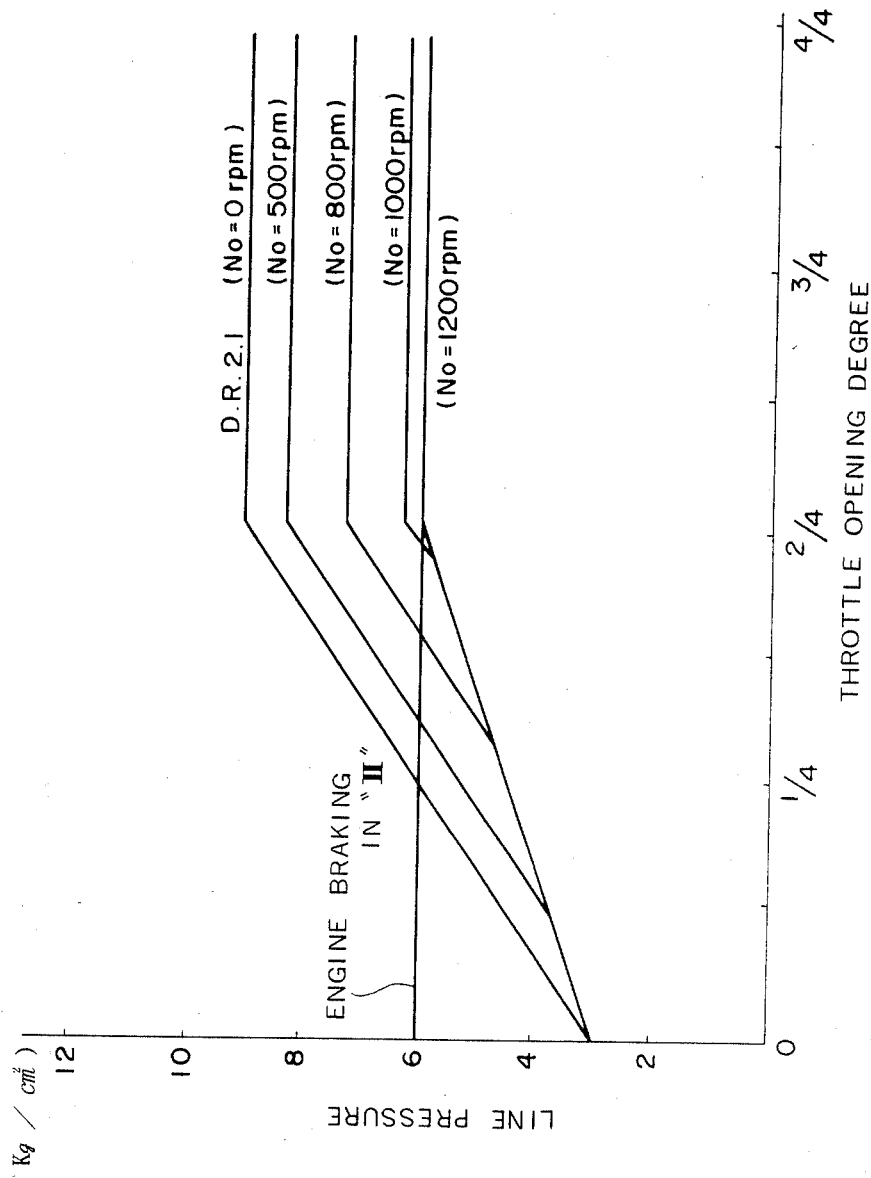
FIG. 7 is a graph showing the variation in a line pressure versus the degree of throttle opening for different rotational speeds of the transmission output shaft.
Figure 8:
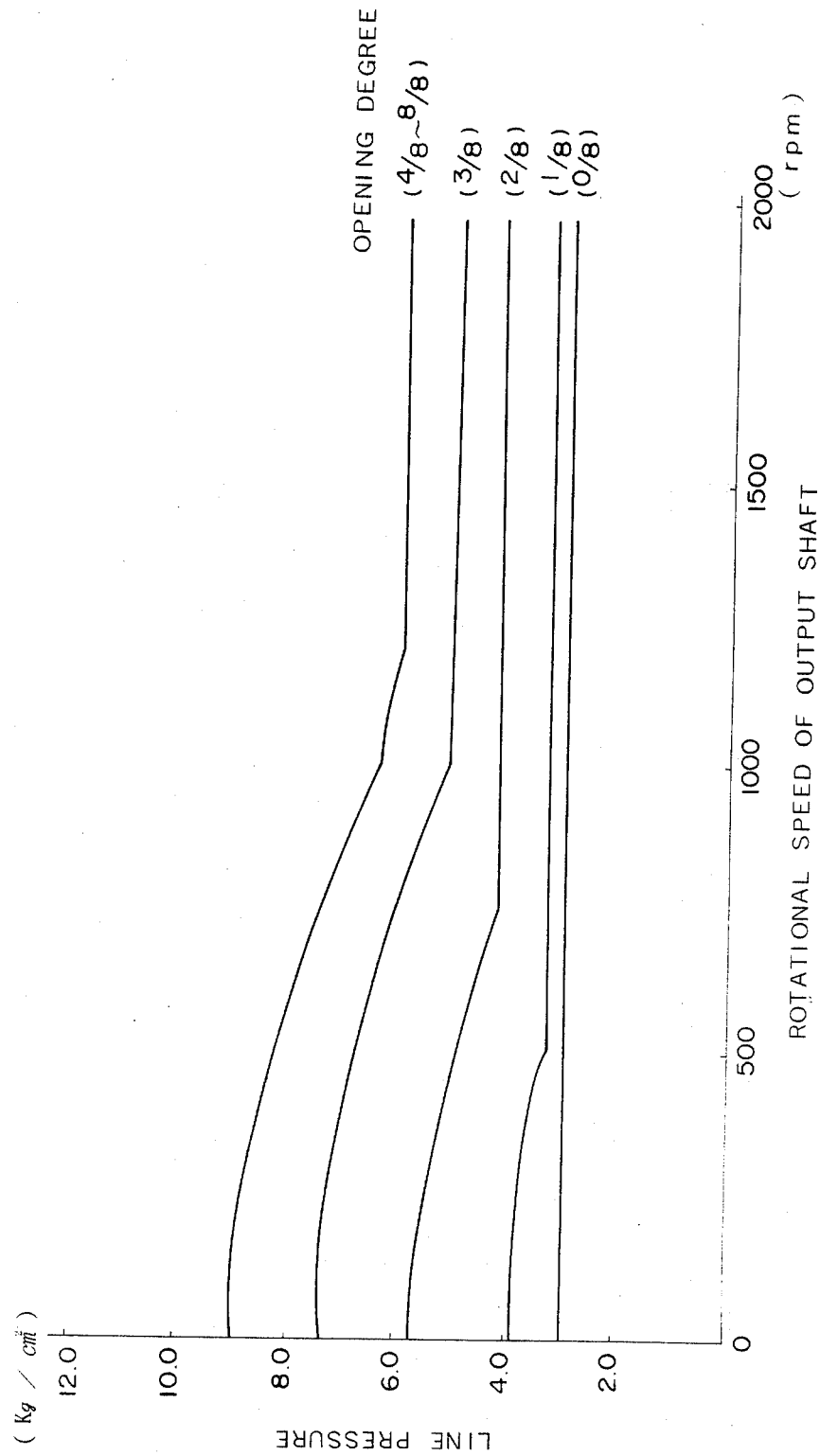
FIG. 8 is a graph showing the variation of the line pressure versus the rotational speed of the transmission output shaft for different degrees of throttle opening.

As described before, the line pressure in the oil conduit 402 is determined by the sum of the upward forces applied to the spool 203. Thus, since the pressure modifier pressure from the pressure modifier valve 12 and the cut back pressure from the cut back valve 14 act on the spool 203 to urge same upward, the line pressure is variable with the variation of these pressures. The pressure modifier pressure and the cut back pressure have characteristics as shown in FIGS. 4 and 5, respectively. The line pressure actually obtained, therefore, shows characteristic as shown in FIG. 7 in terms of the throttle opening degree. When the vehicle travels with the manual valve 4 set in the "II" position or "I" position, since the pressure modifier pressure is constant and the cut back pressure is zero, the line pressure continues to be constant irrespective of the variation in the throttle pressure and that in the governor pressure. When the manual valve 4 is set in the "II" position or "I" position, the line pressure builds up in the oil conduit 428 due to the function of the line pressure booster valve 16, the line pressure in the oil conduit 428 switches the shuttle valve 506 and reaches the oil conduit 426. Thus, the pressure modifier valve 12 receives this line pressure at its port 112$d$, so it produces the constant pressure in the oil conduit 411. The line pressure in the oil conduit 428 is supplied also to the port 114$e$ of the cut back valve 14, urging the spool 214 to move leftwardly and the spool 215 to move rightwardly, allowing the oil conduit 410 to communicate with the drain port 114$b$. Thus, the cut back pressure in the oil conduit 410 drops to zero. Referring to FIG. 7, the reference character No represents the rotational speed of the transmission output shaft O so that the line pressure varies with the variation in the vehicle speed. FIG. 8 shows the variation in line pressure versus the rotational speed of the output shaft O.

The operation of the manual valve 4 in each of the different positions is described.

When the manual valve 4 is in the "N" position thereof, the line pressure is not supplied to none of the ports 104$b$, 104$d$, 104$e$ and 104$f$, rendering them to serve as drain ports. Thus, no oil pressure is supplied to the clutches and brakes, conditioning the automatic transmission in neutral state.

When the manual valve 4 is moved from the "N" position to the "D" position, the line pressure is supplied to the port 104$d$ from the port 104$c$, and this line pressure in the port 104$d$ is supplied to the port 120$g$ of the 1-2 shift valve 20, the port 124$h$ of the 3-4 shift valve 24 and the port 124$h$ of the governor valve 18. The governor valve 18 generates the before mentioned governor pressure variable with the vehicle speed using the line pressure and provides the governor pressure via the oil conduit 430 to the respective shift valves 20, 22 and 24. When the vehicle speed is low, since the governor pressure is low, each of the shift valves 20, 22 and 24 stays in the downshift position thereof. Therefore, the line pressure supplied to the port 120$g$ of the 1-2 shift valve 20 is blocked by the land 221$b$. On the other hand, since the port 124$h$ of the 3-4 shift valve 24 is allowed to communicate with the port 124$g$, the line pressure is supplied to the oil conduit 442, and the line pressure in the oil conduit 442 passes through orifices 658 and 628 to reach the clutch C3 for engagement thereof. As described before, the engagement of the clutch C3 cooperates with the action of the one-way clutch OWC to establish the first forward speed ratio. Since the oil conduit 442 communicates with the chamber 140$b$ of the 4-3 accumulator 40, the line pressure is supplied to the chamber 140$b$, allowing the piston 240 of the 4-3 accumulator 40 which has been pressed down by the line pressure supplied from the oil conduit 402 to move slowly in the upward direction in response to the action of the spring 340. This causes the oil pressure downstream of the orifice 658 to rise slowly, causing gradual engagement of the clutch C3, thus alleviating a shock (a select shock) upon shifting from the "N" position to the "D" position.

When the governor pressure rises to a predetermined value as a result that the vehicle speed has increased after the automotive vehicle has started with the first speed ratio, the upward force due to the governor pressure acting on the spools 220 and 221 overcomes the sum of the downward force by the spring 320 and that due to the throttle pressure acting on the differential area between the lands 220$b$ and 220$c$, thus allowing the spools 220 and 221 to begin to move upward from the downshift position thereof. Immediately after the spools 220 and 221 has begun to move upward, the land 221$d$ of the spool 221 closes the port 120$j$ at the same time the land 221$c$ opens the drain port 120$i$, resulting in a rapid increase in pressure acting area which the governor pressure acts on, allowing the spools 220 and 221 to move to the illustrated left half position thereof in a moment. As a result, the port 120$g$ communicates with the port 120$h$, admitting the line pressure to the oil conduit 432. The line pressure in the oil conduit 432 is supplied via the orifices 656 and 630 to the servo apply chamber S/A. Thus, the brake B2 is engaged and cooperates with the clutch C3 which remains engaged to establish the second forward speed ratio. The line pressure in the oil conduit 432 is admitted to the chamber 138$a$ of the 1-2 accumulator 38, pushing the piston 238 which has been pressed downward by the line pressure acting in the chamber 138$b$ from the oil conduit 402 back in the upward direction. This causes the oil pressure in the downstream portion of the oil conduit 432 to rise gradually, causing the gradual engagement of the brake B2. Consequently, a shock (a shift shock) during a shift from the first speed ratio to the second speed ratio is alleviated.

When the governor pressure further rises up to another value, the upward force due to the governor pressure and acting on the spool 222 of the 2-3 shift valve 22 overcomes the sum of the downward force due to the spring 322 and that due to the throttle pressure acting on the differential area between the lands 222$b$ and 222$c$, allowing the spool 222 to begin to move upward from the downshift position thereof. Immediately after the spool 222 has begun to move upward, the land 222$e$ closes the port 122$i$ at the same time the land 222$d$ opens the drain port 122$h$, causing a rapid increase in the pressure acting area which the governor pressure acts on, and concurrently with this event, the throttle pressure from the port 122$e$ acting on the differential area between the lands 222$b$ and 222$c$ is replaced by the relatively low throttle modulator pressure, resulting in a reduction in the downward force. Therefore, the spool 222 moves to the illustrated left half position thereof in a moment. Thus, the port 122$f$ is allowed to communicate with the port 122$g$, admitting the line pressure in the oil conduit 432 to the oil conduit 434. Since the oil conduit 434 communicates with the clutch C2, the clutch C2 is engaged. The oil conduit 434 communicates with the port 124$e$ of the 3-4 shift valve 24 which in turn communicates with the port 124$d$ when the 2-3 shift valve 24 is in the downshift position thereof, so that the line pressure is supplied also to the port 124$d$. Thus, through the oil conduit 444 connected with the port 124$d$, the line pressure is supplied to the servo release chamber S/R of the brake B2, releasing the brake B2. As a result, the clutch C2 is engaged and the brake B2 is released with the clutch C3 left engaged to establish the third forward speed ratio. If, during the shift from the second speed ratio to the third speed ratio, the engagement of the clutch C2 were not effected in the proper timing with the release of the brake B2, a great shock would take place or the engine would race. In order to provide the proper timing, the 2-3 timing valve 28 is arranged in the oil conduit 434 at a portion between the 2-3 shift valve 22 and the clutch C2. The spool 228 of the 2-3 timing valve 28 is moved to the illustrated right half position thereof or the left half position thereof viewing in FIG. 2(a) depending upon the magnitude of the downward force due to the governor pressure supplied to the port 128a and the magnitude of the sum of the upward force due to the spring 328 and that due to the throttle pressure supplied to the port 128e. That is, in an acceleration state when the accelerator pedal is depressed grately, since the throttle pressure is high, the 2-3 timing valve 28 assumes the illustrated right half position thereof wherein the ports 128c and 128d communicate with each other, the upstream portion of the oil conduit 434 near the port 122g of the 2-3 shift valve 22 is connected with the downstream portion of the oil conduit 434 near the clutch C2 bypassing the orifice 650, thus allowing the clutch C2 to engage swiftly. On the other hand, if the depression degree of the accelerator pedal is decreased, the throttle pressure drops to allow the 2-3 timing valve 28 to assume the illustrated left half position thereof, shutting off the communication between the ports 128c and 128d, providing the state wherein the upstream portion of the oil conduit 434 near the port 122g of the 2-3 shift valve 22 communicates with the downstream portion of the oil conduit 434 near the clutch C2 through the orifice 650. Thus, the oil pressure in the clutch C2 increases gradually, so the engagement of the clutch C2 is slightly delayed. During the period of this delay, the engine revolution speed drops, so that the shift shock is alleviated correspondingly. Hence, the 2-3 timing valve 28 functions to alleviate the shock taking place during shift from the second speed ratio to the third speed ratio while the vehicle is coasting. Midway in the oil conduit 434 extending from the port 122g of the 2-3 shift valve 22 to the port 124e of the 3-4 shift valve 24, the 3-2 timing valve 32, check valve 754 and orifice 654 are arranged in parallel, but since the the flow of oil from the port 122g toward the port 124e agrees with the direction of flow which is allowed by the check valve 754, the oil pressure is supplied to the servo release chamber S/R without being subject to any influence of the flow restriction irrespective of the positions of the 3-2 timing valve 32.

When the governor pressure rises further to still another value as a result that the vehicle has increased its vehicle speed during travelling with the third speed ratio, the upward force due to the governor pressure acting on the spool 224 of the 3-4 shift valve 34 overcomes the downward force due to the throttle pressure from the port 124a acting on the upper end face of the plug 225, causing the spool 224 to begin to move upward from the downshift position thereof. When the throttle pressure is low, since the force of the spring 324 is larger, the plug 225 is pushed upward by the spring 324 so that the above mentioned downward force is provided by the constant force by the spring 324. Immediately after the spool 224 has begun to move upward, the land 224d of the spool 224 closes the port 124j at the same time the land 224c opens the drain port 124i, rapidly increasing the pressure acting area which the governor pressure acts on, urging the spool 224 to move upward to the illustrated left half position thereof in a moment. In this position of the spool 224, the port 124d connected with the servo release chamber S/R is allowed to communicate with the port 124c connected with the oil conduit 442, while the port 124g connected with the oil conduit 442 is allowed to communicate with the port 124f. Therefore, both the clutch C3 and servo release chamber S/R are allowed to communicate with the port 124f. The port 124f is connected via the oil conduit 446 with the port 126d of the 2-4 timing valve 26, but since when the 2-4 timing valve 26 is urged upward by the oil pressure acting thereon from the oil conduit 434 and assumes the illustrated right half position thereof, the port 126d communicates with the port 126c which is a drain port. As a result, the oil pressure in the clutch C3 and that in the servo release chamber S/R are both discharged, disengaging the clutch C3 and engaging the brake B2. Since the clutch C2 is engaged and the brake B2 is engaged, the fourth speed ratio is established. During the shift to the fourth speed ratio, since the oil from the clutch C3 flows through the check valve 758 in the forward direction thereof (the flow direction allowed by the check valve 758), the oil pressure in the clutch C3 is discharged swiftly. On the other hand, since the 3-4 timing valve 30, check valve 752 and orifice 652 are arranged in parallel in the midway in the oil conduit 442 extending from the port 124c to the port 124g, the speed at which the oil pressure is discharged from the servo release chamber S/R differs depending upon the positions assumed by the 3-4 timing valve 30. The 3-4 timing valve 30 is substantially the same in construction as the before mentioned 2-3 timing valve 28. During acceleration, the 3-4 timing valve 30 allows the port 124c of the 3-4 shift valve 24 to communicate with the port 124g of the 3-4 shift valve 24 bypassing the orifice 652, while in coasting operation it shuts off the communication between the port 124c and 124g. Thus, in the latter case, the ports 124c and 124g are connected with each other through the orifice 652. As a result, in coasting operation the oil pressure in the servo release chamber S/R drops gradually and thus the engagement of the brake B2 is delayed as compared to the disengagement of the clutch C3. During the short period of this delay, the engine revolution speed drops, thus alleviating the shift shock correspondigly.

The operation of the 2-4 timing valve 26 is described. If, while the vehicle is travelling with the second speed ratio, the throttle pressure is decreased rapidly, there are occasions when the 2-3 shift valve 22 and 3-4 shift valve 24 are moved from their downshift positions to their upshift positions at the same time. This causes a shift from the second speed ratio directly to the fourth speed ratio. In this case, the clutch C3 is disengaged and the clutch C2 is engaged. For preventing the occurrence of the shift shock nor racing of the engine, it is necessary to disengage the clutch C3 in the proper timing with the engagement of the clutch C2. The oil pressure in the clutch C2 is increased by the oil supplied thereto from the 2-3 shift valve 22 via the oil conduit 434, and this oil pressure in the clutch C2 is also supplied to the port 126f of the 2-4 timing valve 26. The 2-4 timing valve 26 assumes the illustrated left half position thereof in the second speed ratio state because it is pressed down by the throttle pressure supplied to the port 126b. In this position of the 2-4 timing valve 26, the ports 126d and 126e are allowed to communicate with each other, so that the oil pressure in the clutch C3 is discharged via the oil conduit 442, the ports 124g and 124f of the 3-4 shift valve 24, the oil conduit 446, the ports 126d and 126e of the 2-4 timing valve 26, and the orifice 602. Therefore, the oil pressure in the clutch C3 is restricted by the orifice 602 and thus discharged gradually during the initial stage. When the oil pressure in the clutch C2 rises and exceeds a predetermined value, the 2-4 timing valve 26 is urged to move upward to the right half position thereof. When the 2-4 timing valve 26 assumes this position, the oil pressure in the clutch C3 which has been discharged via the port 126e starts to be discharged via the port 126c and thus is not influenced by the flow restriction by the orifice 602. Thus, the oil pressure in the clutch C3 drops rapidly. Since this permits the clutch C3 to be disengaged after the clutch C2 initiates its engagement, a great shift shock or engine racing is prevented from taking place. Since the predetermined value of the oil pressure in the clutch C2 at which the 2-4 timing valve 26 is moved from the illustrated left half position thereof to the right half position thereof rises as the throttle pressure rises, the clutch C3 is disengaged early as the depression degree of the accelerator pedal decreases, thus providing a short period of time during which the neutral state is maintained. During this period of time, the engine revolution speed drops to a level corresponding to the current vehicle speed, thus alleviating the shift shock.

Although, in the above description, the operations of the upshifts between adjacent two speed ratios are described, the downshifts between adjacent two speed ratios are described.

When the governor pressure drops or the throttle pressure rises during travelling with the fourth speed ratio, the 3-4 shift valve 24 is moved from the upshift position thereof to the downshift position thereof, admitting the line pressure in the oil conduit 412 to the clutch C3 via the oil conduit 442 so as to engage same, admitting the line pressure in the oil conduit 434 to the servo release chamber S/R so as to release the brake B2. As a result, the third speed ratio is established by the engagement of clutch C2 and that of the clutch C3. Owing to the function of the 4-3 accumulator 40, the oil pressure in the clutch C3 is allowed to increase gradually. That is, although in the fourth speed ratio state the piston 240 of the 4-3 accumulator 40 is pressed down by the line pressure in the chamber 140a because the oil pressure in the chamber 140b is discharged via the oil conduit 442, the piston 240 is urged to move upward by the spring 340 as the oil pressure builds up in the oil conduit 442 after the 3-4 shift valve 24 has been moved to the downshift position thereof. This upward movement of the piston 240 permits the oil pressure in the oil conduit 442 (i.e., the oil pressure in the clutch C3) to rise gradually. Since the clutch C3 is engaged during this gradual rise in the oil pressure, the clutch C3 is engaged with the appropriate bias force, thus preventing a great shift shock from taking place.

When the governor pressure drops further or the throttle pressure rises further during travelling with the third speed ratio, the 2-3 shift valve 22 is urged to move from the upshift position thereof to the downshift position thereof, allowing the oil pressure in the oil conduit 434 to be discharged to the drain port 122b. Then, the oil pressure which has acted on the clutch C2 disappears and the clutch C2 is disengaged, while the brake B2 is engaged because the oil pressure in the servo release chamber S/R of the brake B2 is discharged via the oil conduit 444, ports 124d and 124e and the oil conduit 434. Therefore, the second speed ratio is established by the engagement of the clutch C3 and that of the brake B2. The discharge of the pressurized oil from the servo release chamber S/R is controlled by the 3-2 timing valve 32. That is, since the 3-2 timing valve 32, the check valve 54 and the orifice 654 are arranged in parallel in the midway in the oil conduit 434 extending from the port 124e of the 3-4 shift valve 24 and the port 122g of the 2-3 shift valve 22, the ports 124e and 122g are communicated with each other bypassing the orifice 654 when the 3-2 timing valve 32 assumes the illustrated left half position thereof, while when the 3-2 timing valve 32 assumes the illustrated right half position thereof, these ports 124e and 122g are communicated with each other via the orifice because the direct communication between them is shut off. The 2-3 timing valve 32 assumes the illustrated left half position thereof when the force due to the throttle pressure acting on the port 132e is larger than the force due to the governor pressure acting on the port 132a (i.e., in acceleration state), while in the reverse case (i.e., in coasting state) the 3-2 timing valve 32 assumes the left half position thereof. Since, in acceleration state, the oil pressure in the servo release chamber S/R is discharged gradually through the orifice 654, the oil pressure in the servo release chamber S/R drops gradually. This causes a slight delay in the engagement of the brake B2 (the oil pressure in the clutch C2 is discharged quickly via the check valve 750 in the oil conduit 434), thus providing a neutral state although very short, allowing the engine to increase its speed to the level corresponding to the vehicle speed. Thus, the variation in engine revolution speed which would take place during the shift is suppressed, thus alleviating the shift shock.

When the governor pressure drops further or the throttle pressure rises further during travelling with the second speed ratio, the 1-2 shift valve 20 is moved from the upshift position thereof to the downshift position thereof, allowing the oil pressure in the oil conduit 432 to be discharged toward the drain port 120i. As a result, the oil pressure acting on the servo apply chamber S/A disappears, releasing the brake B2. Thus, the first speed ratio is established by the engagement of the clutch C3 and the action of the one-way clutch OWC.

The operation under kickdown condition when the accelerator pedal is depressed deeply beyond seven eighths (⅞) of the full stroke thereof is described.

When the accelerator pedal is depressed deeply enough, the plunger 207 of the throttle valve 6 is pushed inwardly in the rightward direction to the illustrated upper half position thereof, rendering the throttle valve 6 inoperative, allowing the line pressure to be supplied to the oil conduit 420. The line pressure supplied from the oil conduit 420 to the port 108a is supplied past the port 108e to the oil conduit 418 which serves as the kickdown pressure circuit. The line pressure in the oil conduit 418 is supplied to the port 120b of the 1-2 shift valve 20 and to the port 122c of the 2-3 shift valve 22, and also to the port 124b of the 3-4 shift valve 24 through the shuttle valve 508 and the oil conduit 440. When the line pressure is supplied to the port 124b of the 3-4 shift valve 24, the plug 225 is pressed downward. Since the governor pressure can not be greater than the line pressure, the spool 224 is always held in the downshift position thereof under the kickdown condition. Thus, whenever the accelerator pedal is depressed to produce the kickdown condition during travelling with the fourth speed ratio, the transmission always shifts down to the third speed ratio and downwards and is prevented from shifting up from the third speed ratio to the fourth speed ratio. The kickdown pressure (line presssure) supplied to the port 122c of the 2-3 shift valve 22 acts on the differential area between the lands 222a and 222b of the spool 222, pressing the spool 222 downward. Since the additional downward force is applied to the spool 222, the 2-3 shift valve 22 can not be shifted until the governor pressure creating the opposed upward force rises high enough to offset the additional downward force. That is, in the kickdown state, a vehicle speed value at which the an upshift from the second speed ratio to the third speed ratio and that at which a donwshift from the third speed ratio to the second speed ratio take place increase greately as compared to the vehicle speed values in the non-kickdown state. The kickdown pressure in the oil conduit 418 is also supplied to the port 110b of the throttle modulator valve 10, rendering the throttle modulator valve 10 inoperative, allowing the line pressure to develop in the oil conduit 424 which was supplied with the throttle modulator pressure. Therefore, since the line pressure is supplied to the port 122d of the 2-3 shift valve 22 and the line pressure is also supplied to the port 122e thereof (this line pressure having replaced the throttle pressure as a result of kickdown state), the same oil pressure acts on the differential area between the lands 222b and 222c of the spool 222 when the spool 222 assumes the upshift position thereof and when the spool 222 assumes the downshift position thereof, so that a difference between the governor pressure value at which the 2-3 shift valve 22 upshifts and that at which the 2-3 shift valve 22 downshifts decreases. In other words, the hystersis between the 3-2 downshift and 2-3 upshift become small in the kickdown state. The kickdown pressure supplied to the port 120b of the 1-2 shift valve 20 acts on the differential area between the lands 220a and 220b when the spool 220 is in the downshift position thereof, and acts on the differential area between the lands 220a and 220b and the differential area between the lands 220b and 220c when the spool 220 is in the upshift position thereof, urging the spool 220 downward. Therefore, the 1-2 shift valve 20 does not shift until the governor pressure increases by an additional value which offsets the additional downward force due to the kickdown pressure. In other words, in the kickdown state, a vehicle speed value at which the 1-2 upshift takes place and that at which the 2-1 downshift takes place increase greately as compared to such vehicle speed values in the non-kickdown state.

Figure 9:
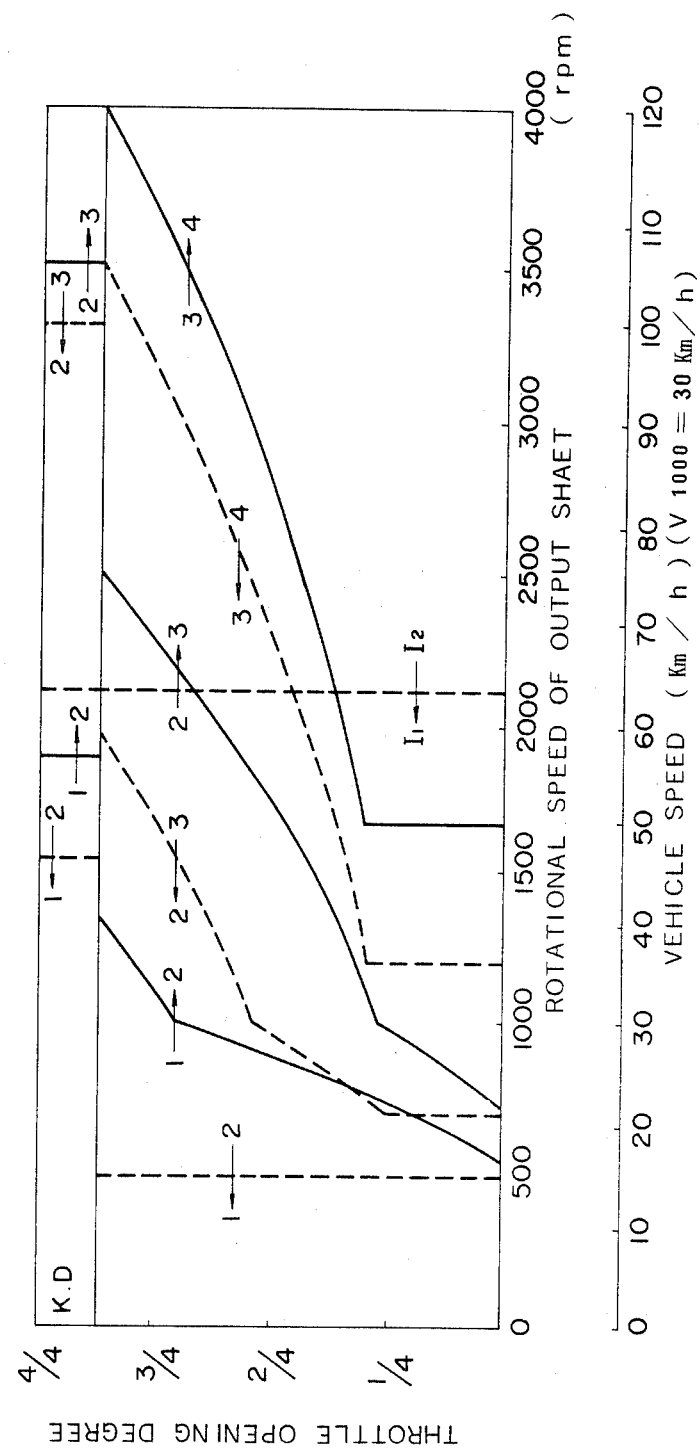
FIG. 9 is shift pattern diagram of the automatic transmission.

The relationship between the vehicle speed and the throttle opening degree at which the automatic shifts take place thus far described is illustrated by the shift diagram as shown in FIG. 9.

The operation of the overdrive inhibitor solenoid 42 is described. As described before, when the solenoid 42 is turned on, the line pressure builds up in the oil conduit 409. The oil pressure in the oil conduit 409 passes through the shuttle valve 504, shuttle valve 508 and oil conduit 440 to reach the port 124b of the 3-4 shift valve 24, urging the plug 225 upward and the spool 224 downward. Thus, irrespective of the magnitude of the governor pressure, the 3-4 shift valve 24 is held in the downshift position thereof, preventing upshift to the fourth speed ratio. Therefore, if the driver does not wish the fourth speed ratio (overdrive) for the travelling condition, what he or she has to do is to manipulate the overdrive inhibitor switch SW to prevent the automatic transmission from operating with the fourth speed ratio.

The operation in the case where the manual valve 4 has been moved to the "II" position during travelling with the third or fourth speed ratio with the manual valve 4 set in "D" position is described.

When the manual valve 4 is placed in the "II" position, since the line pressure develops in the port 104d in addition to the port 104e, the line pressure is supplied to the oil conduit 414. The line pressure in the oil conduit 414 passes through the shuttle valve 504, shuttle valve 508 and oil conduit 440 to the port 124b of the 3-4 shift valve 24. When the line pressure acts on the port 124b, the spool 224 assumes the downshift position thereof for the same reason which was described in connection with the kickdown condition and the operation of the overdrive inhibitor valve 42. The line pressure in the oil conduit 414 is also admitted to the port 122a of the 2-3 shift valve 22, acting on the upper end of the plug 223 to urge it to move downward to the illustrated right half position thereof. As a result, the automatic transmission is forced to shift to the second speed ratio irrespective of the vehicle speed and thus is prevented from shifting to the third speed or fourth speed ratio.

The line pressure in the oil conduit 414 is admitted to the port 116e of the line pressure booster valve 16. Since the line pressure booster valve 16 assumes the lower half position thereof owing to the oil pressure acting on the port 116b, the oil pressure in the port 116e is admitted to the port 116d and thus the line pressure develops in the oil conduit 428. This causes the line pressure to increase to its peak value irrespective of the opening degree of the throttle valve, so that brake B2 which is a band brake is applied strongly enough. Thus, a shift to the second speed ratio is effected swiftly and effective engine braking is provided without any delay.

Since the relationship between pressures acting on the 1-2 shift valve in this case is quite the same as in the case when the manual valve 4 is in the "D" position thereof, the 1-2 shift valve 20 is movable depending upon the relation of the magnitude of the governor pressure to that of the throttle pressure. Therefore, the automatic shift between the first and second speed ratios is carried out even when the manual valve 4 is placed in the "II" position.

Although, as mentioned above, the line pressure is increased to its peak value irrespective of the throttle opening when the manual valve 4 is placed to the "II" position from the fourth speed ratio or the third speed ratio, the line pressure decreases in the following process to the same level as would be when the manual valve 4 is in the "D" position once the automatic transmission shifts to the first speed ratio. The shift from the second speed ratio to the first speed ratio (i.e., when the 1-2 shift valve 20 moves to the downshift position thereof) causes the oil pressure in the oil conduit 432 to be discharged to the port 120i. Thus, the oil pressure acting on the left end of the spool 216 of the line pressure booster valve 16 after passing through the port 116b and the bore 216d of the spool 216 disappears, allowing the spool 216 to move to the upper half position thereof owing to the action of the spring 316, shutting off the communication between the oil conduit 414 and the oil conduit 428, allowing the oil pressure in the oil conduit 428 to be discharged to the port 116c. Thus, the pressure modifier valve 12 and the cut back valve 14 operate in the same manner as they do when the manual valve 4 is in the "D" position. In this circumstance, even if the 1-2 shift valve 20 is moved to the upshift position thereof again and the oil pressure develops in the oil conduit 432, the port 116b of the line pressure booster valve 16 is blocked by the land 216b of the spool 216, so that the line pressure booster valve 16 is held in the illustrated upper half position thereof. Therefore, even if the second speed ratio is selected again, the line pressure will not increase to its peak value. With this function of the line pressure booster valve 16, the shift shock upon a shift between the first speed ratio and the second speed ratio in the "II" position is suppressed as low as that in the "D" position.

When the manual valve 4 is moved to the "I" position, the line pressure develops in the port 104f as well as in the ports 104d and 104e, allowing the line pressure to develop in the oil conduit 416. The line pressure in the oil conduit 416 is admitted to the port 134d of the manual first range pressure reducing valve 34. This line pressure passes through the port 134c and the oil conduit 448 to reach the port 134e, uring the spool 234 upward to an equilibrium state wherein the spool 234 slightly opens the drain port 134b. Thus, the oil pressure in the port 134e (i.e., the oil pressure in the oil conduit 448) will have a constant value which is lower than that of the line pressure and determined by the force of the spring 334. This constant pressure in the oil conduit 448 is admitted via the shuttle valve 502 and the oil conduit 436 to the port 120d of the 1-2 shift valve 20, acting on the upper side of the land 221a of the spool 221, urging the spool 221 to move downward and the spool 220 to move downward. As a result, as long as the governor pressure urging the spool 221 upward is less than a predetermined value, the spool 221 is held in the downshift position thereof (while the spool 220 is in the up position thereof). In this position of the spool 221, the line pressure in the oil conduit 432 is discharged to the drain port 120i, thus releasing the brake B2. At the same time, the port 120d of the 1-2 shift valve 20 is allowed to communicate with the port 120e thereof, allowing said constant pressure in the oil conduit 436 to be supplied to the brake B1. Therefore, the first speed ratio is established by the engagement of the clutch C3 and the engagement of the brake B1 where the effective engine braking is provided. Since if the governor pressure is greater than said predetermined value, the spool 221 of the 1-2 shift valve 20 does not move to the downshift position thereof even when the constant pressure from the first manual range pressure reducing valve 34 acts on the spool 221, the transmission does not shift down to the first speed ratio as long as the vehicle speed is higher than a predetermined value even if the manual valve 4 is placed to the "I" position, thus preventing the engine overrun.

The operation in the case when the manual valve 4 is moved from the "N" position to the "R" position is described. When the manual valve 4 is placed to the "R" position, the line pressure develops only in the port 104b, and this line pressure is admitted via the oil conduit 408 to the clutch C1, and on the other hand it is admitted via the oil conduit 408, shuttle valve 502, and oil conduit 436 to the port 120d of the 1-2 shift valve 20. With this oil pressure acting on the port 120d, the spool 221 of the 1-2 shift valve is always shifted to the downshift position thereof (there is no governor pressure developed because no line pressure exists in the oil conduit 412), so that the oil conduit 436 is allowed to communicate with the oil conduit 438 so as to supply the line pressure to the brake B1. Therefore, the reverse drive is established by the engagement of the clutch C1 and that of the brake B1.

As described before, the present invention is embodied in the 3-4 shift valve 24. This valve is briefly described again.

As described before, the 3-4 shift valve 24 comprises the spool 224, plug 225 and spring 324. When the throttle pressure is relatively greater, the spool 224 and plug 225 operate with the spring 324 being compressed as if they were an integral piece so as to switch the path of oil pressure from one to another. When, on the other hand, the throttle pressure is relatively less, the plug 225 is moved upward viewing in FIG. 2(b) by the spring 324 and separated from the spool 224. Under this condition, the spool 224 is movable from one position thereof to the other position thereof depending upon the relative relationship between the force of the spring 324 and the force due to the governor pressure, so that it shifts its position at a constant vehicle speed irrespective of the throttle pressure.

When the line pressure is admitted to the 3-4 shift valve 24, the plug 225 is moved upward and the spool 224 is moved downward irrespective of the value of the throttle pressure and that of the governor pressure. Thus, under this condition, the 3-4 shift valve 24 assumes the downshift position thereof. Since the 3-4 shift valve 24 has formed therein the port 124b for receiving a downshift position hold signal fluid pressure, i.e., the line pressure, in addition to the port 124a for receiving the throttle pressure, it is no more necessary to arrange a shuttle valve. As a result, a simple hydraulic circuit is obtained.

I claim:

1. A hydraulic control system for an automatic transmission for a motor vehicle having an engine including a throttle which opens in degrees, the transmission being shiftable between a plurality of forward speed ratios the hydraulic control system comprising:
  a source of fluid pressure;
  means communicating with said source of fluid pressure for producing a governor fluid pressure variable with the vehicle speed;
  means communicating with said source of fluid pressure for producing a throttle fluid pressure variable with the degree of throttle opening;
  means for producing a downshift position hold signal fluid pressure;
  a shift valve including means for defining a valve bore, a spool slidably disposed in said valve bore for movement between a downshift position and an upshift position and having at least one pressure acting area which is exposed to said governor fluid pressure, a plug having a pressure acting area which is exposed to said throttle fluid pressure, and a spring disposed between said spool and plug and acting therebetween, said governor pressure acting area, when acted upon by said governor pressure urging said spool to move from said downshift position thereof to said upshift position thereof against said spring, said throttle pressure acting area, when acted upon by said throttle fluid pressure, urging said plug to move said spool from said upshift position thereof to the downshift position thereof;
  said spool having a first signal pressure acting area and said plug having a second signal pressure acting area;
  said valve bore defining means being formed with a bias port opening into said valve bore, said bias port providing communication between said downshift position hold signal fluid pressure producing means and said first and second signal pressure acting areas so as to allow said downshift position hold signal fluid pressure to act upon said first and second signal pressure acting areas,
  said first signal pressure acting area, when acted upon by said downshift position hold signal fluid pressure, urging said spool to move from said upshift position thereof to the downshift position thereof, said second signal pressure acting area, when acted upon by said downshift position hold signal fluid pressure urging said plug to move away from said spool said valve bore opening means being formed with a first group of ports comprising first, second and third ports, and also with a second group of ports comprising fourth, fifth and sixth ports;

said spool being formed with axially spaced first, second and third control lands, said first and second control lands cooperating with said first group of ports to connect said second port selectively to said first or third port, said second and third control lands cooperating with said second group of ports to connect said fifth port selectively to said fourth or sixth port.

2. A hydraulic control system as claimed in claim 1, wherein said means for producing the downshift position hold signal fluid pressure includes means for supplying a fluid pressure to said bias port when a manual valve is set in a forward drive position other than an automatic forward drive position, means for supplying a fluid pressure to said port when the transmission is in a kickdown condition and means for supplying a fluid pressure to said port when an electric device is operated, an operating condition.

3. A hydraulic control system as claimed in claim 1, wherein when said spool assumes said downshift position, said first control land closes said first port and said second control land closes said fourth port and said first and second control lands cooperates to allow fluid communication between said second and third ports, and said third control land cooperates with said second control land to allow fluid communication between said fifth and sixth ports, whereas, when said spool assumes said upshift position thereof, said second control land closes said third port and cooperates with said first control land to allow fluid communication between said second and first ports, and said third control land closes said sixth port and cooperates with said second control land to allow fluid communication between said fourth and fifth ports, said first port communicating with said fourth port whereby said second port is allowed to communicate with said fourth port via said first and fifth ports when said spool assumes said upshift position thereof.

* * * * *